United States Patent
Williams et al.

(10) Patent No.: US 10,732,653 B2
(45) Date of Patent: Aug. 4, 2020

(54) ELECTRICAL POWER SUPPLY SYSTEM AND PROCESS

(71) Applicant: THIRD EQUATION LTD, London (GB)

(72) Inventors: Matthew Williams, Victoria (AU); Andrew Scobie, Victoria (AU)

(73) Assignee: THIRD EQUATION LTD, London (GB)

(*) Notice: Subject to any disclaimer, the term of this patent is extended or adjusted under 35 U.S.C. 154(b) by 0 days.

(21) Appl. No.: 16/323,404

(22) PCT Filed: Aug. 7, 2017

(86) PCT No.: PCT/AU2017/050831
§ 371 (c)(1),
(2) Date: Feb. 5, 2019

(87) PCT Pub. No.: WO2018/023175
PCT Pub. Date: Feb. 8, 2018

(65) Prior Publication Data
US 2019/0369651 A1 Dec. 5, 2019

(30) Foreign Application Priority Data
Aug. 5, 2016 (AU) .............................. 2016903095

(51) Int. Cl.
*G05F 1/325* (2006.01)
*G05F 1/32* (2006.01)
(Continued)

(52) U.S. Cl.
CPC .............. *G05F 1/325* (2013.01); *G05F 1/32* (2013.01); *H01F 3/14* (2013.01); *H01F 30/12* (2013.01); *H01F 30/16* (2013.01)

(58) Field of Classification Search
CPC ... G05F 1/10; G05F 1/32; G05F 1/325; H01F 3/14; H01F 30/12; H01F 27/34; H01F 27/28
See application file for complete search history.

(56) References Cited

U.S. PATENT DOCUMENTS

| 6,788,180 B2 | 9/2004 | Haugs |
| 7,061,356 B2 | 6/2006 | Haugs |

(Continued)

FOREIGN PATENT DOCUMENTS

| WO | 2003/044613 A1 | 5/2003 |
| WO | 2005/050341 A1 | 6/2005 |

OTHER PUBLICATIONS

International Search Report dated Sep. 18, 2017 for International Application No. PCT/AU2017/050831, 5 pages.
(Continued)

*Primary Examiner* — Adolf D Berhane
(74) *Attorney, Agent, or Firm* — Knobbe, Martens, Olson & Bear, LLP

(57) ABSTRACT

An electrical power supply system can include:
  at least one virtual air gap transformer;
  a heterodyning component configured to generate a corresponding heterodyned signal having frequency components corresponding to a sum and a difference of the first fundamental frequency and a reference frequency;
  a filtering component configured to filter a heterodyned signal to remove one of the sum and the difference frequency components therefrom and provide a corresponding filtered signal;
  an input port; and
  a control component configured:
    (i) to receive a signal and to generate a corresponding frequency control signal to determine a reference
(Continued)

frequency of the heterodyning component such that the filtered signal has a target output frequency; and (ii) to receive a signal representing the first input voltage, and to generate a corresponding virtual air gap control signal to determine the electrical current in the control windings of the at least one virtual air gap transformer.

23 Claims, 20 Drawing Sheets

(51) Int. Cl.
*H01F 3/14* (2006.01)
*H01F 30/12* (2006.01)
*H01F 30/16* (2006.01)

(56) References Cited

U.S. PATENT DOCUMENTS

| | | |
|---|---|---|
| 8,643,281 B2 | 2/2014 | York |
| 2003/0117251 A1 | 6/2003 | Haugs |
| 2005/0110605 A1 | 5/2005 | Haugs et al. |
| 2012/0074844 A1 | 3/2012 | York et al. |
| 2019/0204859 A1* | 7/2019 | Williams ............... G05F 1/32 |

OTHER PUBLICATIONS

Written Opinion of the International Searching Authority dated Sep. 18, 2017 for International Application No. PCT/AU2017/050831, 4 pages.

* cited by examiner

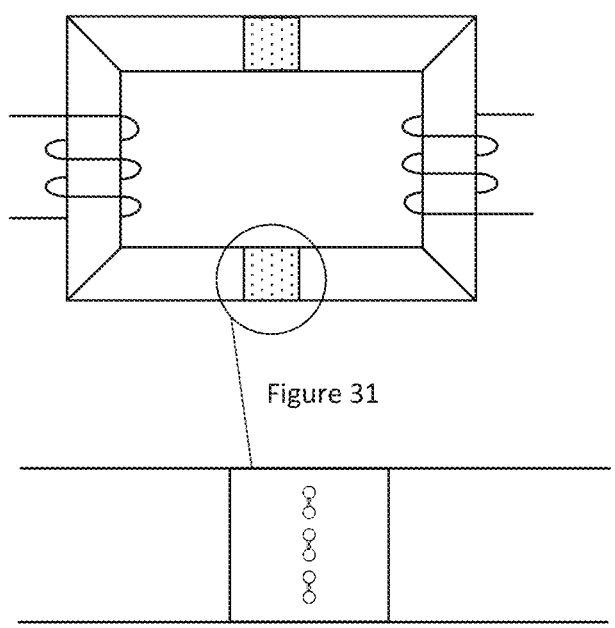
Figure 31
Figure 32
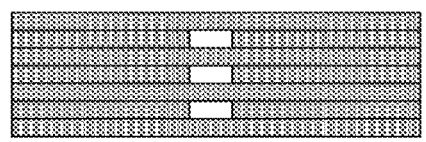
Figure 33
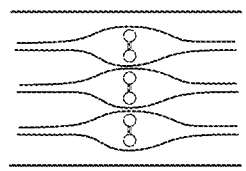
Figure 34

ELECTRICAL POWER SUPPLY SYSTEM AND PROCESS

CROSS REFERENCE TO RELATED APPLICATIONS

This application the U.S. National Phase Application under 35 U.S.C. § 371 of International Application No. PCT/AU2017/050831, filed Aug. 7, 2017, which claims priority to Australian Application No. 2016903095, filed on Aug. 5, 2016, the entire disclosure of each of which is hereby incorporated by reference.

TECHNICAL FIELD

The present invention relates to electrical energy supply, and in particular to an electrical power supply system and process.

BACKGROUND

The Global Energy Problem

The ability to harness the stored energy of fossil fuels in the form of electricity has enabled humans to make amazing advances toward our wellbeing. However, as the global demand for electricity continues to increase, it is widely anticipated that the resulting impact on the environment will ultimately reach a point where it becomes a threat to our survival. Therefore, resolving the constraints to universal access to electricity without unsustainable environmental consequence is a social and economic priority of the highest order.

To meet the legitimate aspirations of the world's population and impact poverty, the US Energy Information Administration estimates an increase of over 50% in global energy requirements by 2040 (Reference: International Energy Outlook 2016). At the same time, a significant decrease in environmental impact and cost of energy is required. Our traditional power generation methods use fossil fuels that are all constrained resources. At present, our only proven clean generation options are hydro, geothermal, biomass, solar and wind. Of these, solar and wind present the best opportunity to meet our future needs, as the others have very specific geographic inputs and requirements.

The global consensus of policymakers is that we need to dramatically increase our clean energy generation, as evidenced by the recent Paris Climate or COP21 agreement. However, with our current and forecast advances in clean generation technology, the design of our electricity networks is incapable of allowing us to achieve the mandated goals. In particular, integration is a well-known and unsolved issue.

Electricity System Overview

The entire electricity supply chain can be generally grouped into three areas: generation, distribution, and consumption. In order to maintain a reliable power supply, energy generation is controlled to meet consumption through an end-to-end network.

Electricity distribution networks are the largest manmade objects ever created. To date, they have all been conceived and constructed for very specific operating conditions under a single design schematic. The design schematic is relatively simple: generation in the past was easily and adequately equilibrated with consumption. A small number of dispatchable generation sources supplied a series of tranched or grouped consumers. The topology of electrical networks tends to be a mixture of radial (a single large generator with consumers progressively tranched in a tree structure around it), and more complex and redundant path network topologies such as mesh and ring topologies. These topologies are designed to provide a good balance of reliability and cost based on the current network demands of a few large stable and dispatchable generators and many consumers.

At present, the vast majority of electricity generation is directly controllable as it is produced from fossil fuels. The table below outlines the current makeup of electricity generation for the US and UK.

TABLE 1

| Percentage of Total Electricity Generation by Source (2015) | | | | |
|---|---|---|---|---|
| Coal | Gas | Nuclear | Base load Renewables | Variable Renewables |

| | Coal | Gas | Nuclear | Base load Renewables | Variable Renewables |
|---|---|---|---|---|---|
| US | 33% | 33% | 20% | 8% | 5% |
| UK | 23% | 30% | 21% | 11% | 14% |

As the level of renewable energy generation increases, our ability to control the supply of electricity to match demand becomes increasingly difficult. If this balance of supply and demand is not maintained, the stability and availability of electricity is threatened.

As the makeup of generation is changing toward more renewable energy, the characteristics of the electricity supply are changing, both the physical architecture of the network and our ability to control generation levels. This causes increasing issues of stability and efficiency, with the threshold capability of current electricity network architecture falling far short of required levels to meet our climate change targets. Attempting to resolve the situation through control of generation and/or consumption alone has intolerable social, economic and environmental effects. The configuration of the electricity distribution network needs to adapt if our electricity supply chain is to remain viable and deliver on our social and economic intentions.

Electricity System Balancing Requirement Maintaining a reliable electricity supply requires the voltage and frequency of the grid to be maintained within a narrow band of about +/−1%. Other than the limited storage options currently available, electricity must be consumed when it is generated, and consequently supply and demand must be balanced to maintain the required target voltage and frequency. Until now, this has been accomplished by monitoring the grid at a coarse high level, and then adjusting the output of controllable generation sources that are largely fossil fuel, nuclear or hydro-electric.

Balancing of the grid can be categorised into three response times:
Long Term (days to weeks)
Medium Term (hours)
Short Term (milliseconds to minutes)

The UN report 'Global Trends in Renewable Energy Investment 2016' states there are currently four potential balancing options, with an unacceptable fifth currently also being utilised globally.

In the case where demand exceeds supply:
  i. Increasing the amount of faster responding conventional generation i.e. gas, coal or diesel;
  ii. Interconnectors to transport electricity from one grid to another; and
  iii. Demand response by paying larger industrial and commercial consumers to reduce usage when supply is falling short of demand.

In the case where supply exceeds demand:
  iv. Energy storage to store excess electricity when it is available and release it back into the grid when required; and
  v. Curtailment of renewable energy generation to directly reduce supply A combination of these solutions in parallel would be plausible to attempt to manage the long and medium term balancing of grids. Currently, each option either has prohibitive costs, unacceptable consequences, or both.

For the short term response (milliseconds to seconds and minutes) of balancing of our grids, none of these options will successfully allow the increased penetration and consumption of renewable generation whilst maintaining a reliable power supply, for at least the reasons discussed below.

Short Term Grid Balancing Issues

The following outlines the issues that must be overcome in relation to renewable energy integration into the grid.

System Frequency

All generators inject power into our grid as alternating current (AC), and are synchronised to operate at the same frequency and phase. The amount of power injected by each generator is balanced through the ratio of its power output rating compared to all other generators injecting power into the system in order to evenly distribute the load. This occurs naturally unless modified by operator control.

Traditional fossil fuels, nuclear and even hydro power are all synchronous generators which introduce inertia to help maintain this frequency, and are controllable, providing frequency response and stability. They remain synchronised due to the self-regulating properties of their interconnection. If one generator deviates from its synchronous speed, power is transferred from the other generators in the system in such a way as to reduce the speed deviation. The stored inertial energy of the generators provides a short-term counteraction to frequency change, with governors taking over after a few seconds.

In contrast, wind and Solar Generation use significantly different technologies, producing DC power and injecting it into the AC grid through converters. This means that they are decoupled from the grid frequency, and results in asynchronous operation with no inertial energy to contribute. It is possible for converters equipped with governor-like controls to respond to frequency drops, however this cannot occur fast enough to adequately compensate and maintain grid stability. It can also only occur when the generation source is operating in a curtailed condition.

Grid Architecture

Our electricity grids have been specifically designed to deliver a reliable electricity supply from power sources through a transmission network over a long distance to load centres on a distribution network. The entire ontology of our grids is changing due to the local and dispersed nature of renewable energy generation. Our current grid hardware is incapable of adequately distributing these new power sources bi-directionally and both vertically and horizontally through the network, causing a myriad of power engineering problems, including a reduction in the capacity of the network.

Current methods for addressing these issues primarily involve additional hardware and software systems to mitigate undesired effects. These technologies are generally accepted as increasing network fragility and cost without addressing the root cause.

Control

Renewable energies such as wind and solar are not dispatchable like traditional fossil fuels, nuclear or hydro power. As we do not have control over the energy input (i.e. the wind or the sun), we are unable to ramp up or down as required to balance the system, or maintain a steady state of output. We can only actively manage the output to maintain the required power level through storage solutions or by curtailing the generation. However, curtailment is pure waste.

Variability

The rate at which the power output of renewable energies such as wind and solar can change is much faster than traditional generation technology. This occurs in two major forms:
  Intermittence—renewable energy sources have long periods of unavailability due to input requirements outside of direct control (i.e. sunlight and wind).
  Volatility—at all times constant variation in the output from renewable energy generation is occurring. The two main constituents of this are the rapid rate of change of output generation, and the noise inherent to the output signal.

The law of averages helps in part to mitigate the instantaneous effects of volatility with the vast number of solar and wind generation sources. However, maintaining voltage and frequency in the short term (milliseconds to seconds) remains a significant unresolved challenge. Currently available responsive dispatchable generation technology is still significantly slower to react than the rate of change introduced by volatile renewable generation. There is no current solution to this issue.

Efficiency

Electricity grids are designed to work at a specific operating point, with a narrow band of operation due to consumption requirements. When the voltage or frequency deviates from the optimal point, the efficiency of the grid and its devices decreases, resulting in greater energy losses. Energy losses in developed grids are 5%-10%, with up to half of this loss due to non-fixed inefficiency losses. When the voltage or frequency goes outside the set operating boundaries, system protection actions are automatically undertaken which leads to both brown outs and black outs for hardware protection and safety.

A New Approach to Existing Electricity Networks

It is unanimously agreed that our current electricity transmission and distribution networks are unable to provide a usable power supply above a certain threshold penetration of clean energy from wind and solar. This threshold point varies for each network based on physical architecture, generation and load profiles, as well as a myriad of other factors.

The design architecture and technology that our electricity networks use has significantly improved in cost and efficiency over the last 120 years. Yet it still utilities the same fundamental technology and design architecture that were established in the 19th Century. One of the fundamental underpinnings of the entire electricity system, the transformer, is a passive device that is unable to effectively deal with the variability that is being imposed on its operations. For example, a transformer is exceedingly efficient at its designed operating point, but its efficiency deteriorates rapidly away from this point. A device with the capability to accept a much wider range of operating conditions with efficiency is required. The added ability to actively control operations and affect power flow through the system allows further stability and security to be delivered.

All currently proposed options to upgrade our networks rely on existing operating methodologies, technologies and systems. In the case of energy storage, the technology to make this economically feasible has not yet been invented. All these options add significant cost, complexity and fragility into the network and reduce its efficiency.

It is desired to alleviate one or more difficulties of the prior art, or to at least provide a useful alternative.

SUMMARY

In accordance with some embodiments of the present invention, there is provided an electrical power supply system, including:
- at least one virtual air gap transformer, including at least one primary winding, at least one secondary winding, and one or more control windings to control the electromagnetic coupling between the primary and secondary windings;
- a heterodyning component configured to receive a signal having a first fundamental frequency and to generate a corresponding heterodyned signal having frequency components corresponding to a sum and a difference of the first fundamental frequency and a reference frequency;
- a filtering component configured to filter a heterodyned signal to remove one of the sum and the difference frequency components therefrom and provide a corresponding filtered signal;
- an input port configured to receive a first input signal having a first input fundamental frequency and a first input voltage; and
- a control component configured:
  (i) to receive a signal representing at least the first input fundamental frequency of the first input signal and to generate a corresponding frequency control signal to determine a reference frequency of the heterodyning component such that the filtered signal has a target output frequency; and
  (ii) to receive a signal representing the first input voltage, and to generate a corresponding virtual air gap control signal to determine the electrical current in the control windings of the at least one virtual air gap transformer, such that a target output voltage is generated at the secondary windings;
- wherein the electrical power supply system receives input electrical energy in the form of the first input signal having the first input fundamental frequency and the first input voltage, and generates corresponding output electrical energy in the form of a corresponding first output signal of the target frequency and the target output voltage.

In some embodiments, the system is configured for bi-directional use such that the system receives second input electrical energy in the form of a second input signal having a second input fundamental frequency and a second input voltage, and generates corresponding output electrical energy in the form of a corresponding second output signal of a second target frequency and a second target output voltage, wherein the second input signal or a corresponding signal derived from the second input signal is applied to the secondary winding of the at least one virtual air gap transformer to generate a corresponding signal having the second target output voltage at the primary winding of the virtual air gap transformer.

In some embodiments, the second input signal or a corresponding signal derived from the second input signal is received by the heterodyning component to generate a corresponding second heterodyned signal having second frequency components corresponding to a sum and a difference of the second fundamental frequency and a reference frequency, and the filtering component is configured to filter the second heterodyned signal to remove one of the sum and the difference frequency components therefrom and provide a corresponding second filtered signal.

In some embodiments, the heterodyning component is a first heterodyning component, the filtering component is a first filtering component, and the system includes a second heterodyning component and a second filtering component, wherein the first heterodyning component and the first filtering component are configured to process signals flowing through the system along a first pathway, and the second heterodyning component and the second filtering component are configured to process signals flowing through the system along a second pathway generally opposite in sense to the first pathway.

In some embodiments, the heterodyning component is a first heterodyning component, the filtering component is a first filtering component, and the system includes a second heterodyning component and a second filtering component, wherein the heterodyning components and the filtering components are configured such that the first signal received by the system is upconverted to a higher frequency by the first heterodyning component and the first filtering component before being provided as an input to the at least one virtual air gap transformer, and the corresponding output of the at least one virtual air gap transformer is downconverted to the target frequency by the second heterodyning component and the second filtering component, the use of the higher frequency improving the efficiency of the at least one virtual air gap transformer.

In some embodiments, the at least one virtual air gap transformer includes two or more virtual air gap transformers connected in series by one or more corresponding loops configured to store energy.

In some embodiments, the electrical power supply system includes one or more inductors and/or one or more capacitors configured to store and release energy.

In some embodiments, the at least one virtual air gap transformer includes at least one single-phase virtual air gap transformer.

In some embodiments, the at least one virtual air gap transformer includes at least one three-phase virtual air gap transformer.

In some embodiments, the at least one virtual air gap transformer includes at least one shell-type virtual air gap transformer.

In some embodiments, the at least one virtual air gap transformer includes at least one virtual air gap transformer having a magnetic core composed of different materials having respective different magnetic properties such that a region of the magnetic core in which a virtual air gap is formed in the magnetic circuit is composed of a first material and another region of the magnetic core is composed of a second material, wherein at least one magnetic property of the first material has a different value to a value of that at least one magnetic property of the second material.

In some embodiments, the at least one virtual air gap transformer includes a virtual air gap transformer having one or more control windings disposed between opposing faces of respective pole pieces of the virtual air gap transformer.

In some embodiments, each control winding is in the form of a serpentine planar loop.

In some embodiments, each control winding is in the form of a spiraling circular planar loop.

In some embodiments, the control windings include one or more serpentine planar loops and one or more spiraling circular planar loops.

In some embodiments, the control windings are wound around a core section.

In some embodiments, the at least one virtual air gap transformer includes a virtual air gap transformer having a magnetic core with mutually spaced openings formed therein, one or more control windings being wound through the openings and around portions of the magnetic core disposed between the openings.

In some embodiments, the magnetic core is formed by stacked laminations, and the openings are defined by gaps in the stacked laminations.

In some embodiments, the magnetic core is in the form of a solid body, with openings formed by drilling after manufacture.

In some embodiments, the at least one virtual air gap transformer includes multiple virtual air gaps arranged to selectably define opposing flux paths through the at least one secondary winding.

In some embodiments, the at least one virtual air gap transformer includes multiple virtual air gaps arranged to define multiple flux paths to allow control of the amount of flux flowing through the at least one secondary winding.

In accordance with some embodiments of the present invention, there is provided an electrical power supply process, including:
  receiving, at a control component of an electrical power supply system, at least one signal representing at least a time-varying first fundamental frequency of a first input signal and a time-varying first voltage of the first input signal;
  processing the received signal to generate:
    (i) a corresponding frequency control signal to cause a heterodyning component of the electrical power supply system to generate a corresponding heterodyned signal having frequency components corresponding to a sum and a difference of the first fundamental frequency and a reference frequency; and
    (ii) a corresponding voltage control signal to cause a virtual air-gap transformer of the electrical power supply system to generate a corresponding signal having a target output voltage;
  whereby the received input electrical energy in the form of the first input signal having the first input fundamental frequency and the first voltage is processed to generate corresponding output electrical energy in the form of a corresponding first output signal of the target frequency and the target output voltage.

In some embodiments, the heterodyning component is a first heterodyning component, the filtering component is a first filtering component, and the system includes a second heterodyning component and a second filtering component, wherein the process includes controlling the heterodyning components and the filtering components such that the first signal received by the system is upconverted to a higher frequency by the first heterodyning component and the first filtering component before being provided as an input to the at least one virtual air gap transformer, and the corresponding output of the at least one virtual air gap transformer is downconverted to the target frequency by the second heterodyning component and the second filtering component, the use of the higher frequency improving the efficiency of the at least one virtual air gap transformer.

Also described herein is an electrical power supply system, including:

at least one virtual air gap transformer, including at least one primary winding, at least one secondary winding, and at least one control winding to control the electromagnetic coupling between the primary and secondary windings;

a heterodyning component configured to receive a signal having a first fundamental frequency and to generate a corresponding heterodyned signal having frequency components corresponding to a sum and a difference of the first fundamental frequency and a reference frequency;

a filtering component configured to filter a heterodyned signal to remove one of the sum and the difference frequency components therefrom and provide a corresponding filtered signal;

an input port configured to receive a first input signal having a first input fundamental frequency and a first voltage; and a control component configured:
  (i) to receive a signal representing at least the first fundamental frequency of the first input signal and to generate a corresponding frequency control signal to determine the reference frequency of the heterodyning component such that the filtered signal has a target output frequency; and
  (ii) to receive a signal representing the first voltage, and to generate a corresponding virtual air gap control signal to determine the electrical current in the control windings of the at least one virtual air gap transformer, such that a target output voltage is generated at the secondary windings;

wherein the electrical power supply system receives input electrical energy in the form of the first input signal having the first input fundamental frequency and the first voltage, and generates corresponding output electrical energy in the form of a corresponding first output signal of the target frequency and the target output voltage.

Also described herein is an electrical power supply process, including:
  receiving, at a control component of an electrical power supply system, at least one signal representing at least a first fundamental frequency of a first input signal and a first voltage of the first input signal;
  processing the received signal to generate:
    (i) a corresponding frequency control signal to cause a heterodyning component to generate a corresponding heterodyned signal having frequency components corresponding to a sum and a difference of the first fundamental frequency and a reference frequency; and
    (ii) a corresponding voltage control signal to cause a virtual air-gap transformer to generate a corresponding signal having a target output voltage;
  whereby received input electrical energy in the form of the first input signal having the first input fundamental frequency and the first voltage is processed to generate corresponding output electrical energy in the form of a corresponding first output signal of the target frequency and the target output voltage.

BRIEF DESCRIPTION OF THE DRAWINGS

Some embodiments of the present invention will now be described, by way of example only, with reference to the accompanying figures, wherein:

FIG. 31 is a schematic illustration of a single phase core type transformer constructed of four sections, with two sections housing the primary and secondary windings, and the other two sections having three subsections, with a different material making up the middle subsection;

FIG. 32 is a schematic illustration of a virtual air gap consisting of 6 holes in a vertical configuration, with three individual control winding loops;

FIG. 33 is a schematic illustration of a standard laminate stacking process for transformers, with breaks in some laminates, which with the use of spacers will allow holes for the control winding within the core without the need for drilling;

FIG. 34 is a schematic illustration of the altered flux path within a magnetic core due to a current being applied to the control windings;

DETAILED DESCRIPTION

Embodiments of the present invention include an electrical power supply system and process that involve receiving input electrical energy in the form of an input signal having some frequency and voltage, and converting that input electrical energy to output electrical energy in the form of an output signal having a desired or 'target' frequency and a desired or 'target' output voltage. The input electrical energy will typically vary over time (that is, its frequency and/or voltage is time-dependent), and thus the system and process operate to dynamically control the conversion so that the output electrical energy has the desired target frequency and target voltage, which themselves may also vary over time.

Embodiments of the present invention are able to provide frequency and voltage conversion while simultaneously providing power factor correction, utilising high-speed electromagnetic path switching instead of electronic circuit switching to deliver improved efficiency and regulation (as well as electrically isolating the two systems).

Although embodiments of the present invention are primarily described herein in the context of mains power distribution, it will be apparent to those skilled in the art that other embodiments may be used in essentially any electrical system application that requires control of output voltage and/or frequency, including variable frequency drives (VFDs) for electric cars, electrical systems for aviation, and other applications, for example. Many other applications of the electrical power supply system and process described herein will be apparent to those skilled in the art in light of this disclosure.

In this specification, unless the context indicates otherwise, the term "signal" is used for convenience of reference, and is to be construed broadly as referring to a form of electrical energy characterised by a voltage and at least one fundamental frequency (which could be zero in the case of a DC voltage), and does not necessarily require that any form of information is represented by or conveyed by the signal, notwithstanding that some embodiments of the invention may involve the communication of information encoded in the signal.

Figure 1:
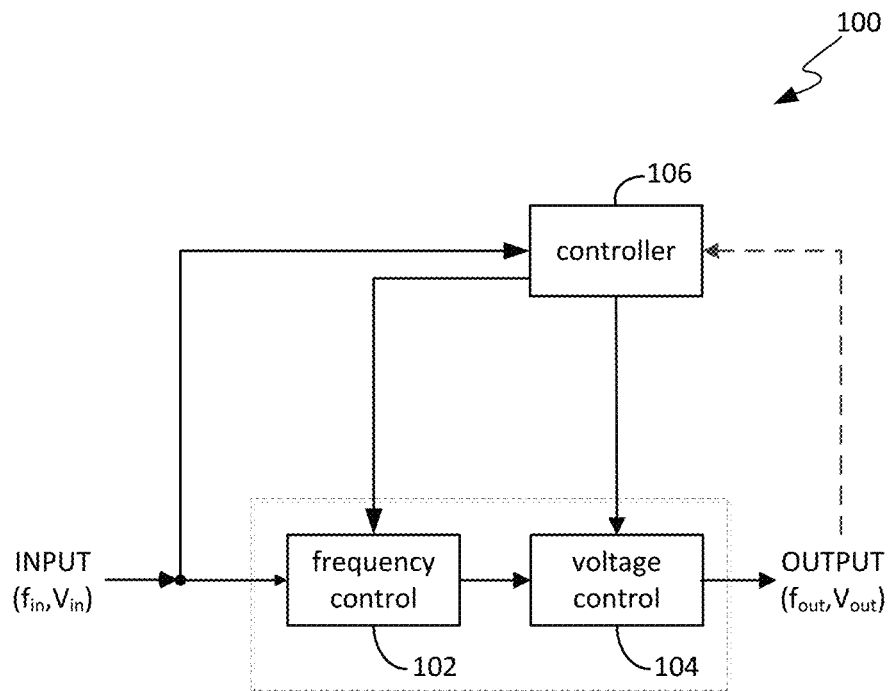
FIG. 1 is a block diagram of an electrical energy supply system in accordance with some embodiments of the present invention.

As shown in FIG. 1, an electrical power supply system 100 includes a frequency control component 102, a voltage control component 104, and a controller 106. As described above, the frequency control component 102 receives an input signal of some characteristic input frequency, and provides a corresponding output signal having a selected or desired output frequency, regardless of the input frequency. Similarly, the voltage control component 104 receives an input signal of some characteristic input voltage, and provides a corresponding output signal having a selected or desired output voltage, regardless of the input voltage. In combination, the frequency control component 102 and the voltage control component 104 act in concert so that the system 100 receives an input signal having some (typically time-varying) characteristic frequency $f_{in}$ and voltage $V_{in}$, and generates a corresponding output signal having a selected frequency $f_{out}$ and a selected voltage $V_{out}$. For example, where the electrical power supply system 100 is used as part of a mains electricity distribution system, the system 100 can be configured so that the output frequency $f_{out}$ is constant and equal to the appropriate mains electricity frequency of 50 Hz or 60 Hz, and the output voltage is dynamically adjusted to match the electrical load on the system 100. Deviation from the nominal mains frequency is a major source of losses within an electricity grid.

The controller 106 uses step down devices (e.g., buck converters in the described embodiments) to monitor the input frequency and voltage and generates corresponding frequency and voltage control signals that are respectively used to control the operation of the frequency control component 102 and the voltage control component 104.

As known by those skilled in the art, a transformer is an electromagnetic device that transfers electric energy from one circuit to another circuit via mutual inductance, and is typically made up of a primary winding, a magnetic core and a secondary winding. When an alternating voltage is applied to the primary winding, an alternating current flows through the primary winding. This magnetizing current produces an alternating magnetic flux. The flux is mostly constrained within the magnetic core, and induces voltage in the linked secondary winding, which if connected to an electrical load produces an alternating current. This secondary load current then produces its own alternating magnetic flux which links back with the primary winding.

The secondary voltage is determined by the product of the primary voltage and the ratio of the number of turns in the secondary winding and the number of turns in the primary winding. Transformers are commonly used to convert between high and low voltages, but they are bulky by necessity at distribution frequencies. They offer high efficiency, simplicity of design, and bidirectional power transfer. However their passive nature affords limited regulation of the power transferred, requiring the introduction of inefficient power factor control and voltage regulation. The physics of operation at mains supply frequencies also makes them comparatively large for a given power rating, increasing costs of materials, fabrication and insulation management.

Voltage Conversion

Figure 2:
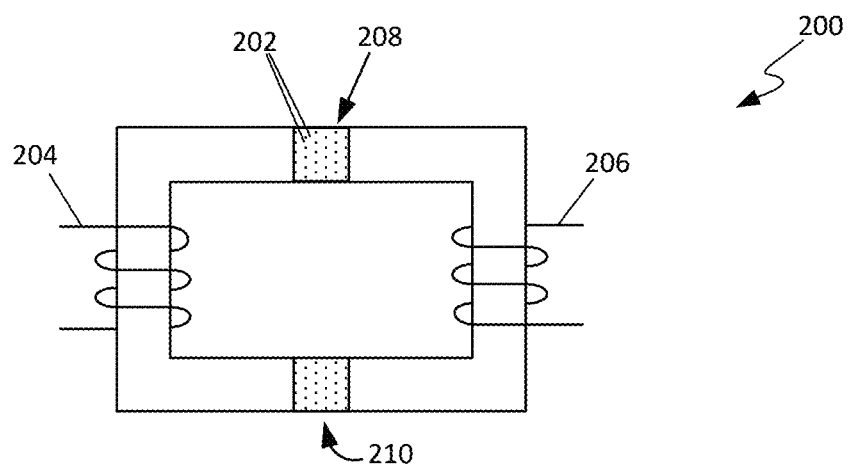
FIG. 2 is a schematic illustration of a virtual air-gap transformer (VAGT) of an electrical energy supply system in accordance with some embodiments of the present invention, in this example consisting of a single phase core type transformer with virtual air gaps in the flux path, with energy stored as magnetic field energy primarily within the air gaps.
Figure 3:
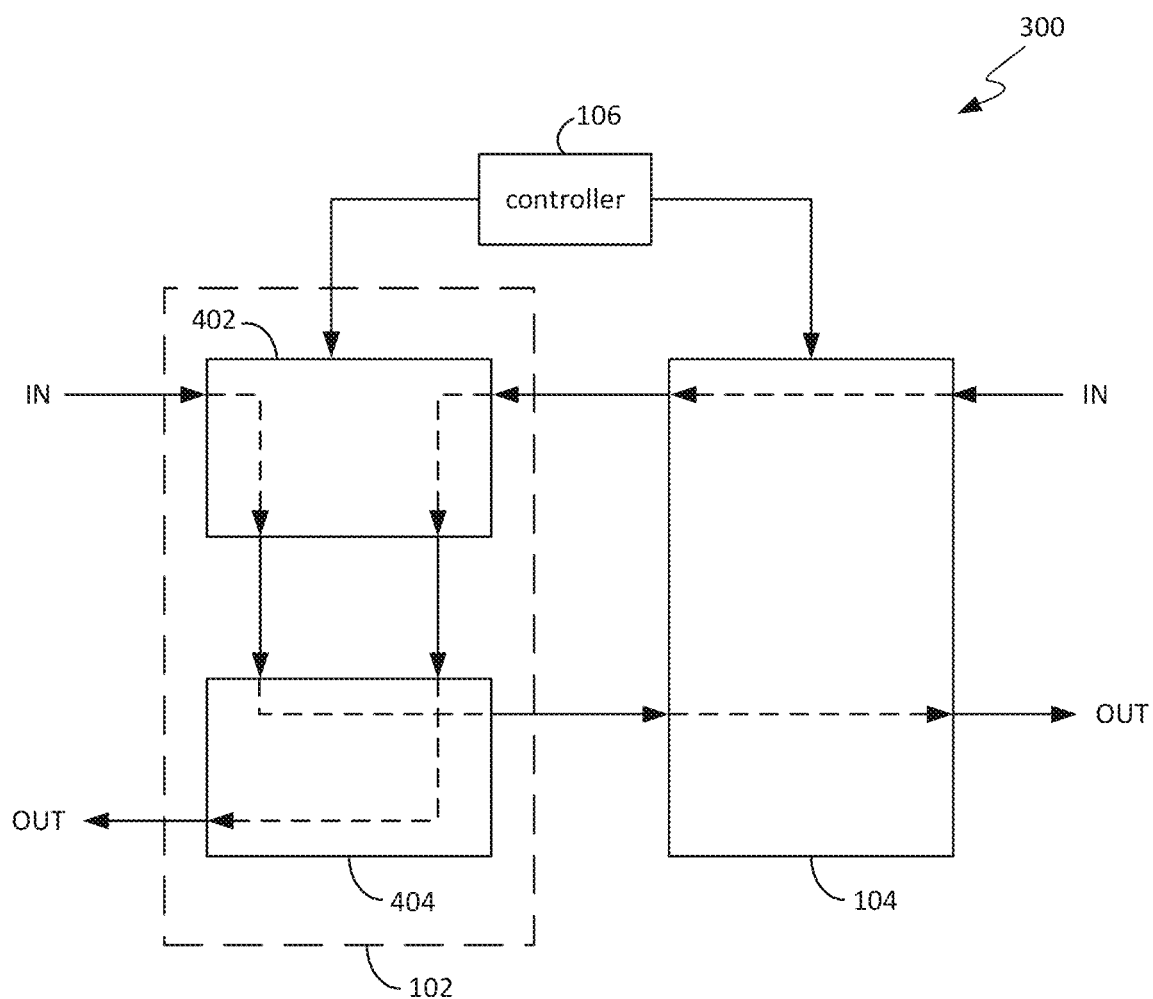
FIG. 3 is a block diagram showing bi-directional flow of electrical energy through the VAGT and a heterodyning component and a filtering component of an implementation of an electrical energy supply system.

Voltage conversion is achieved by providing the voltage control component 104 in the form of a transformer configuration referred to herein as a 'virtual air-gap transformer' or 'VAGT' 200, as shown in FIG. 2, in which at least one control winding 202 is disposed in the magnetic flux path between the primary winding 204 and the secondary winding 206 of the transformer to controllably saturate a local region 208 of the magnetic core, and thereby control the electromagnetic coupling between the primary 204 and secondary 206 windings, and thus determine the voltage generated across the secondary winding 206. The effect of saturating a local region 208 of the magnetic flux path is equivalent to the effect of a physical airgap in the magnetic flux path, with the size of the saturated region 208 (and thus the equivalent ('virtual') airgap 208) at any time being determined by the electrical current flowing through the control winding 202 at that time. This control current through the control winding 202 can be either DC or AC, as determined by the specific requirements of each implementation, with each current type providing different characteristics and complexity. For example, DC current is used for simplicity of control, whereas AC current is used for more complex control and provides lower electrical leakage losses.

In addition to the various control current implementations, some implementations of the device can apply a short circuit to the control winding 202, or to some of the control windings when multiple windings are implemented. During the short circuit application, the control winding affects the magnetic core flux in such a way to resist any change to the state of the system at that point. Utilising this phenomenon at localised points within the magnetic core, and magnetic core cross section, the flux path can be altered and saturated.

By dynamically monitoring the input voltage across the primary winding 204 and knowing the relationship between secondary and primary winding voltages as a function of the current flowing through the control winding 202, the current flowing through the control winding 202 can be dynamically adjusted to provide a selected or desired voltage across the secondary winding 206.

Additionally, in some implementations of the device, the voltage is measured across the secondary winding 206 as well as the voltage across primary winding 204. In some implementations of the device, the voltage and frequency is measured on either the primary winding, secondary winding, or both.

Figure 28:
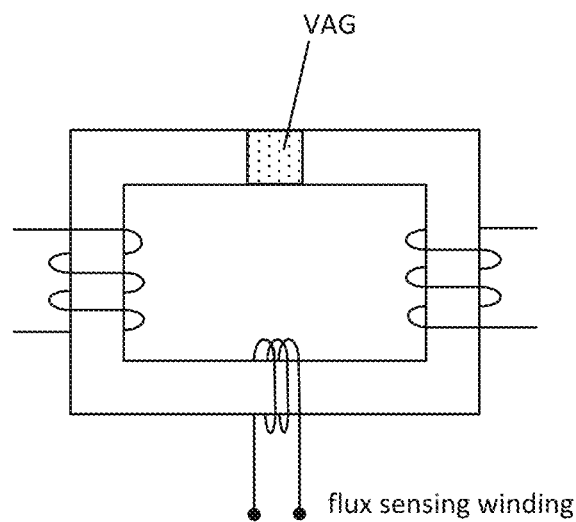
FIG. 28 is a schematic illustration of a single phase core type virtual air gap transformer, with a flux sensing winding to measure the core flux.

In some configurations of the device, the flux through the core of the VAGT is measured. The magnetic flux is relative to the electrical power flowing through the device, and is the force that is being controlled by changing the reluctance of the magnetic circuit using the control winding. Depending on the specific requirements of the implementation, the flux is measured by Hall Effect sensors (such as http://uk.rs-online.com/web/c/automation-control-gear/sensors-transducers/hall-effect-sensors/) or a winding around the magnetic core as shown in FIG. 28. It will be apparent for those skilled in the art that any of a number of known configurations and sensing methods can be used to achieve this measurement.

In a magnetic circuit driven by an AC flux source, the main magnetic flux ($\Phi m$) is determined by the driving voltage ($\Phi m = f\, vdt$). The flux density within the core has a reluctance which can be calculated as:

$$\mathscr{R}_m = \frac{\ell}{\mu_0 \mu_r A_c}$$

where l is the magnetic path length, $A_c$ is the core cross sectional area, and $\mu_0\mu_r$ is the core permeability.

The magnetomotive force (mmf) in the core is a function of the flux and the reluctance. Changes in the reluctance of the core due to changes in the virtual air gap produce corresponding changes in the mmf, which in turn produces changes in the primary inductance of the VAGT 200.

The core has an associated total mmf that is a function of the flux and the reluctance, according to:

$$mmf = \Phi_m(\mathscr{R}_m + \mathscr{R}_g)$$

Figure 27:
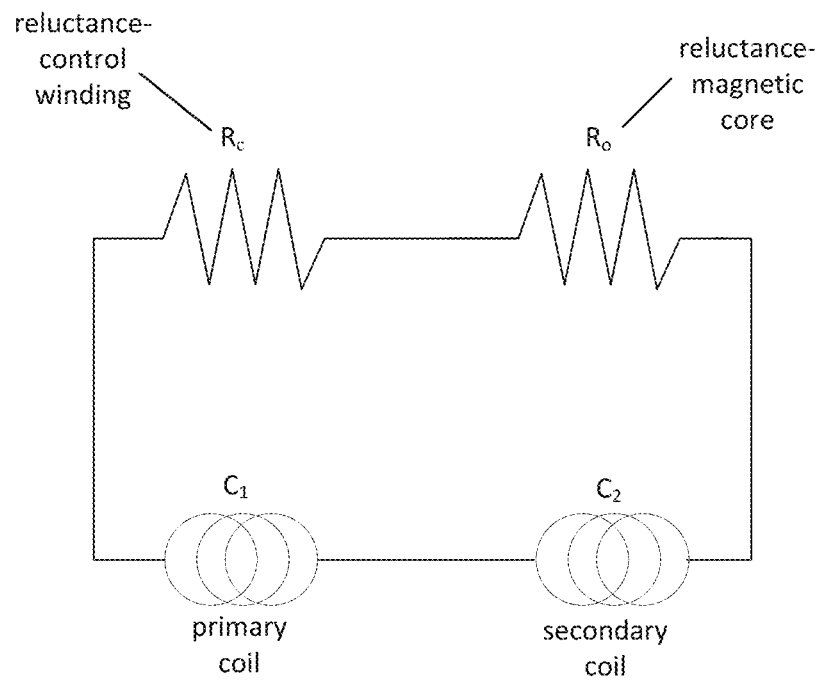
FIG. 27 is a schematic illustration of a magnetic circuit showing the primary and secondary windings, the core reluctance and the controlled reluctance of the virtual air gap.
Figure 29:
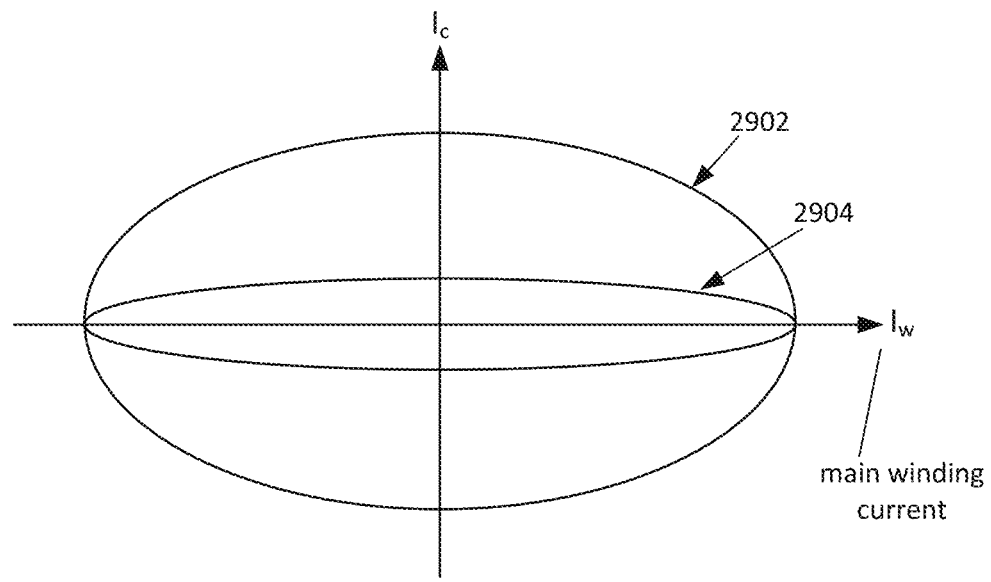
FIG. 29 is a diagrammatic illustration of the relationship between the current in the control winding and the current in the primary winding, and the change in shape by minimising the control current.

If an air gap is inserted into the magnetic circuit, the reluctance increases due to the addition of an air gap reluctance ($\mathscr{R}_g$), thereby increasing the mmf. A simple representative circuit diagram of this is provided in FIG. 27. The case for a standard DC driving voltage is different because the mmf and current are constant, with the flux varying with changing reluctance. A DC driving voltage modulated with harmonics is able to reduce harmonic outputs under certain operating conditions (see http://ieeexplore.ieee.org/document/4595983/). An AC driving voltage modulated reduces energy usage, and when correctly controlled improves energy utilisation for the device and the output power. FIG. 29 shows that as the current in the primary winding 204 changes through the cycle, the amount of current required in the control winding 202 changes, thus reducing the control current required (e.g., from curve 2902 to curve 2904) to achieve the output target signal, and improving the efficiency of the device.

The virtual air gap 208 is provided within the primary flux path in order to provide control of the power flow through the VAGT. However, a second virtual air gap 210 may also be provided in the return flux path, as shown in FIG. 2. Depending on the physical structure (including whether the VAGT is single phase or 3 phase), a VAGT may have multiple virtual air gaps, ensuring that, at a minimum, the primary flux path for each phase can be directly controlled. Multiple virtual air gaps can be utilised in some embodiments to vary the level of localised saturation.

As a minimum, a virtual air gap is formed by two DC or AC windings arranged to produce opposing fluxes so that they cancel each other out in relation to the entire VAGT, but saturate the core in each corresponding local saturation region. The specific configuration of a VAGT (including winding and core materials and configurations, laminations, dimensions, core size and shape, number of phases and face configurations, et cetera) can be determined using standard transformer design methods known to those skilled in the art, with the number and location of virtual air gaps, and the configuration of the control winding(s) being determined by the electrical requirements for the specific application.

The magnetic core of the transformer containing the virtual air gap may be made of any material whose magnetic reluctance can be controlled by the current flowing through the control windings, including but not limited to ferromagnetic materials. The core itself may be formed as a unitary structure, or may be constructed from multiple component parts, which may be made from the same or different materials for different regions of the magnetic core. This allows the localised ferromagnetic properties of the core where virtual air gaps are formed to be different to those of other regions of the magnetic core, with different magnetisation curves (also known as magnetic hysteresis curves or more commonly B-H Curves, where B=flux density, H=field strength, $\mu$=permeability and B=$\mu$H).

The power flow through a VAGT is regulated by controlling its virtual air gap(s) 208, 210. As the input power and output power draw can be constantly changing, the virtual air gap(s) 208, 210 are correspondingly adjusted by changing the DC or AC control current in the control winding(s) 202 to provide a selected level of reluctance. The control current can be either a direct analog signal, where the current level is changed directly, or can take the form of a digital signal using pulse width modulation (PWM) to provide an equivalent average current. PWM uses a digital signal switched at a rate much higher than will affect the load to control the power supplied. Switching the voltage to a load with the appropriate duty cycle approximates the desired voltage level. In the same manner, the duty cycle can be varied to deliver an approximation of an analog waveform using digital sources. Modern semiconductors are able to provide this switching in microseconds, meaning that power loss is very low, but the imperfect waveform produce can cause significant harmonics and losses in some applications.

Figure 24:
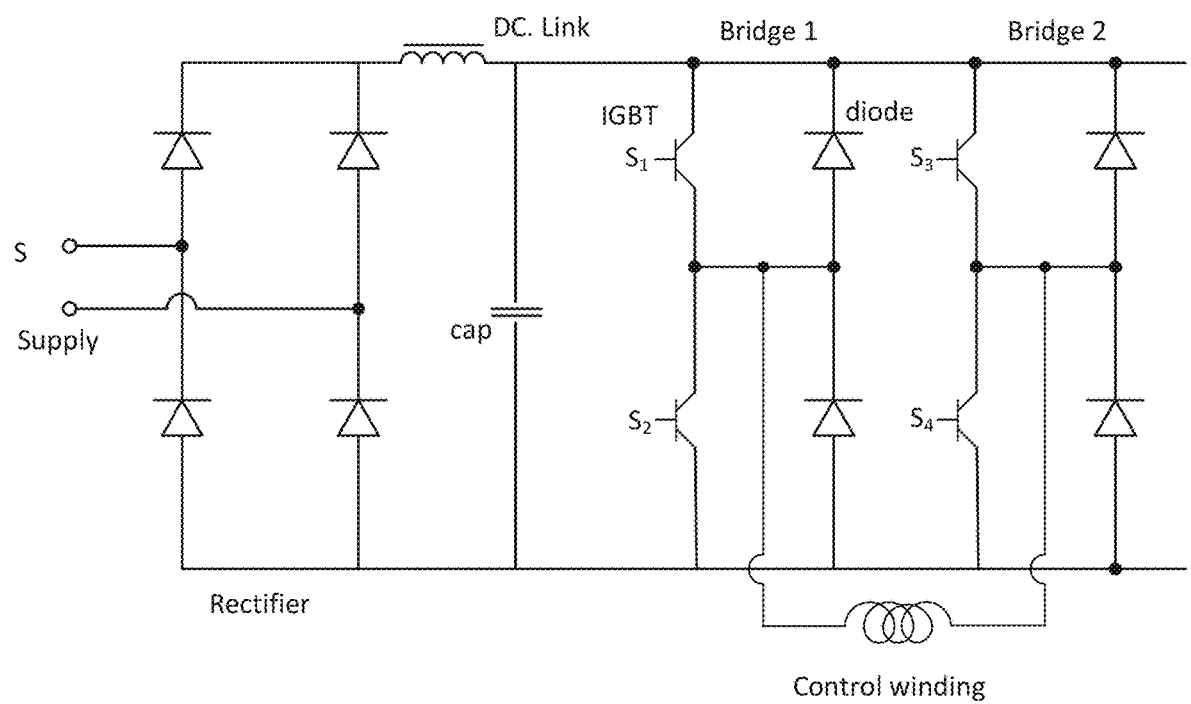
FIG. 24 is a circuit diagram with a rectifier, a DC link and two bridge circuits to provide pulse width modulation of a control winding.

PWM of the current through the control winding 202 is achieved through a control circuit consisting of a rectifier, a DC link, and two bridges, as shown in FIG. 24. The two bridges are made up of four diodes and four insulated-gate bipolar transistors (IGBT). The four IGBT's are switched on and off by controller 106 in order to provide the correct current level in the control winding 202 to deliver the target signal output. It will be apparent to those skilled in the art that this can be achieved in a number of various circuit topologies. A control circuitry topology utilising step down converters (buck converters) allows a greatly reduced power usage to achieve the desired magnitude and range of virtual air gap control.

Figure 30:
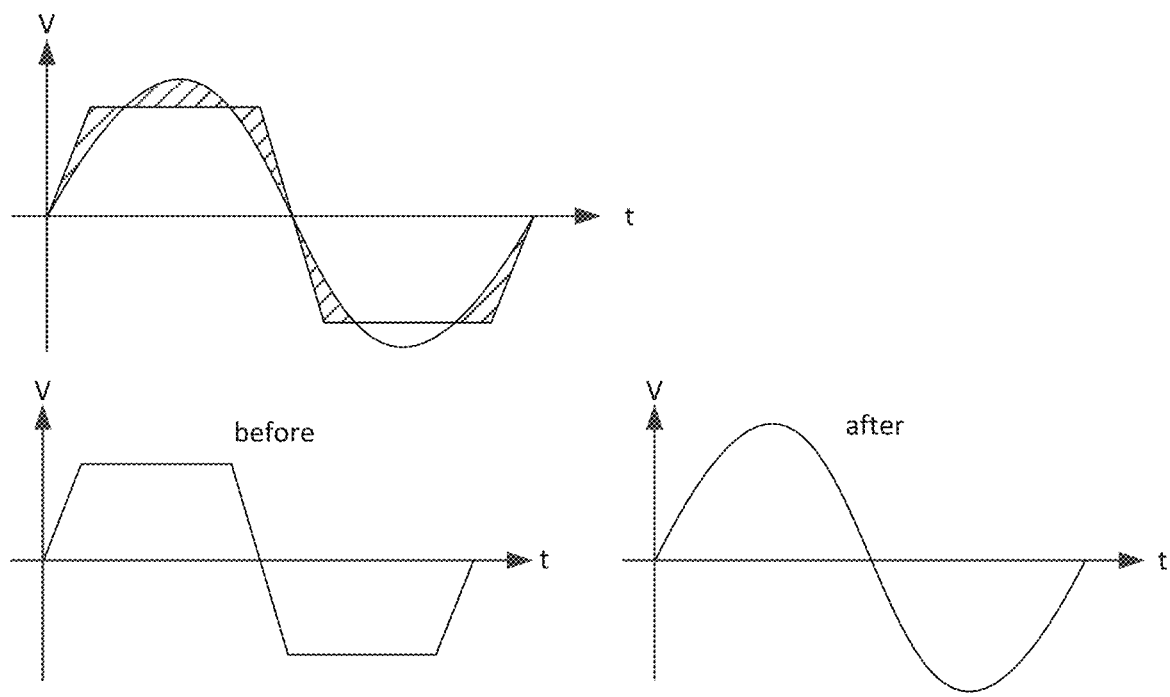
FIG. 30 is a diagrammatic illustration of a waveform before and after modulation through the device, comparing the two on a single axis to demonstrate the short term shift in power from one section of the curve to another.

By controlling the PWM at a speed of 10 kHz, the waveform of the output signal is modulated using the VAG in order to smooth out harmonics, as shown in FIG. 30. It will be apparent to those skilled in the art that the speed of control is bound by the practicality of implementation of technology at the upper end, with any frequency of control being able to be used. Faster control speeds better compensate and correct harmonics.

When the mean power flow is used as the control point, there is approximately equal variance in voltage for both over voltage and under voltage through the VAGT over time. A small amount of internal power storage is available within the VAGT to compensate for the under voltage times, with over voltage peaks chopped. This over voltage power loss is significantly less than the inefficiencies and losses created by passively passing through the over-voltage.

In order to reduce the internal power storage requirement, the power level the VAGT is controlled for can be lower than the mean input voltage. This increases the quantity of over voltage time on average, increasing the corresponding losses which will nevertheless still be insignificant relative to other losses of the distribution network. The exact control power level is determined by the requirements of the specific application.

Figure 36:
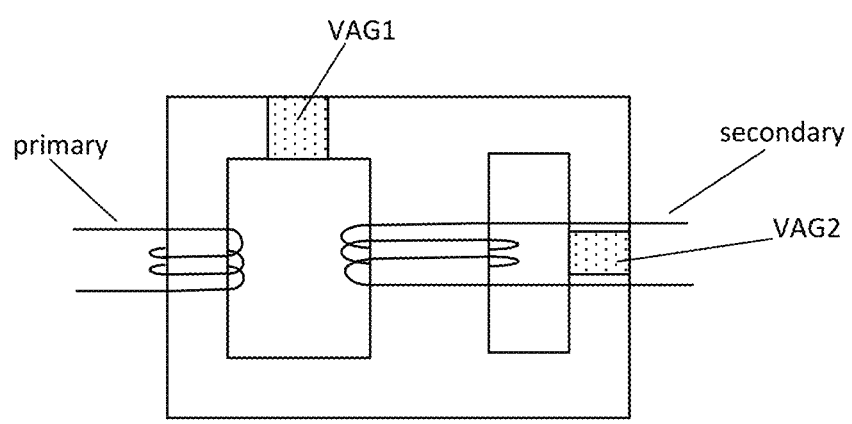
FIG. 36 is a schematic illustration of a composite virtual air-gap transformer (VAGT) with multiple flux paths controlled by multiple virtual air-gaps to allow magnetic flux to controllably distribute between the differing pathways and thus alter the amount of flux flowing through the secondary winding.

As shown in FIG. 36, in some embodiments, the magnetic core has a secondary flux pathway to distribute the flux between two paths through the magnetic core, changing the flux flowing through the secondary winding under steady state conditions. The voltage conversion ratio of the device is directly proportional to the number of primary windings and the primary current, and the number of secondary windings and the secondary current, and is independent of the magnetic circuit reluctance under steady state conditions. The second flux pathway controlled by a second virtual air-gap in combination with the virtual air-gap controlling the primary flux pathway provide the relative distribution of the total flux between the two pathways. The secondary winding on the primary flux pathway will only have a current induced relative to the flux flowing through the primary pathway, and can be changed without changing the number of primary or secondary windings.

In some embodiments, an energy recovery circuit is used to store the excess energy blocked by the virtual air gap and that would be otherwise lost. This energy can be stored within a capacitor, inductor or other energy storage device, and subsequently reinjected into the main power flow through the device directly, or directly from the capacitive, inductive or other storage.

Frequency Conversion

In some implementations of an electrical power supply system as described herein, the frequency control component 102 achieves frequency conversion in the same manner as voltage conversion. As the frequency of the coupled electrical system is dependent on the frequency of the generated electricity and balanced with the load, as this balance between generation and load varies, the frequency of the system will vary. By measuring the input and output frequency of the electrical power supply system 100, a measured difference indicates an imbalance. Therefore changing the control winding current, and therefore the virtual air gap, the reluctance of the circuit will change and energy will be injected into or taken from the power flow as described below. That is, the same VAGT(s) constitute(s) both the voltage control component 104 and the frequency control component 102, as indicated by the dashed box around the frequency control component 102 and the voltage control 104 in FIG. 1, and there is only a single control signal (representing voltage) from the controller 106 to the VAGT(s), but that signal is also used to control frequency as described above.

Figure 35:
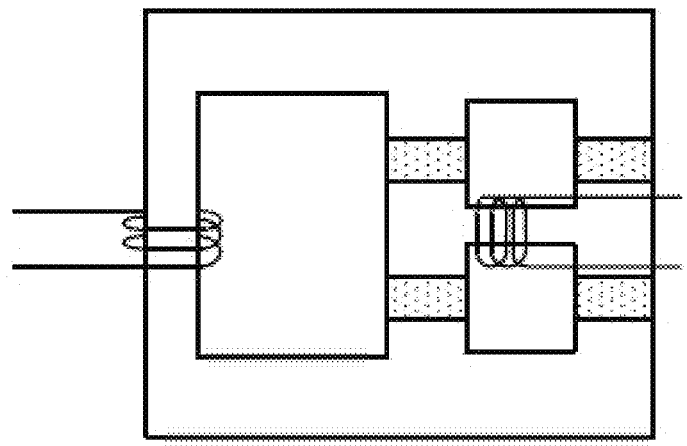
FIG. 35 is a schematic illustration of a composite virtual air-gap transformer (VAGT) with multiple flux paths controlled by multiple virtual air-gaps to redirect flux through the magnetic core and change flux direction through the secondary winding.

The VAG can be used to saturate the core in localised areas and thus affect the flux path. Using the core structure in FIG. 35, the frequency of the output signal can be converted by using multiple VAG's to alternate the flux path through the secondary winding. This allows the same device to function as both an inverter and a rectifier with all switching in the magnetic field, utilising the natural filtering of magnetic circuits.

A large number of possible configurations for the electrical power supply system described herein will be apparent to those skilled in the art in light of this disclosure. In one such configuration a core type transformer is manufactured using standard core cutting and stacking techniques (see, for example, http://sites.ieee.org/gms-pes/files/2014/11/Transformer-Manufacturing-Processes.pdf). As shown in FIG. 31, the two core sections with no primary or secondary windings are composed of three sections of ferromagnetic material in series: material 1, material 2, and material 1. Material 1 and 2 have different B-H curves.

6 holes are formed within material 2 of the core during the manufacturing process, at equidistant spaces vertically aligned through the core cross section, as shown in FIGS. 31 to 34. In this particular example, these holes are formed by having the core layers made of separate pieces, as shown in FIG. 33, rather than a single contiguous sheet.

These pieces are aligned using spacers during the stacking process which can be removed once stacking is complete.

The primary and secondary windings are wound around the appropriate sections. The control winding is wound between the holes created within the core construction process, as shown in FIG. 32. With the holes numbered 1 through 6 vertically, the winding is formed between holes 1 and 2 for the required number of loops, then 3 and 4, then 5 and 6.

Figure 25:
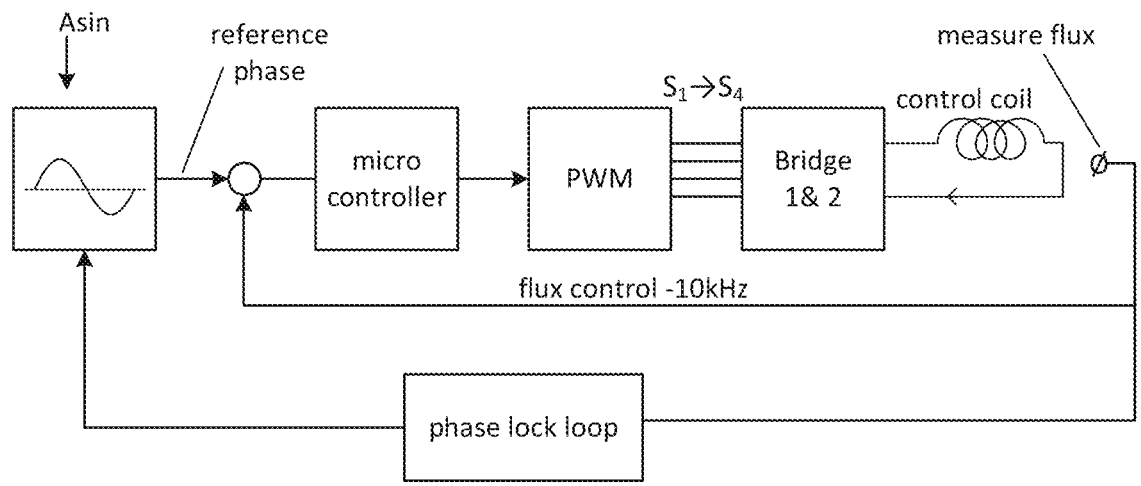
FIG. 25 is a schematic illustration of the control loops and function blocks to provide control of a virtual air gap transformer.
Figure 26:
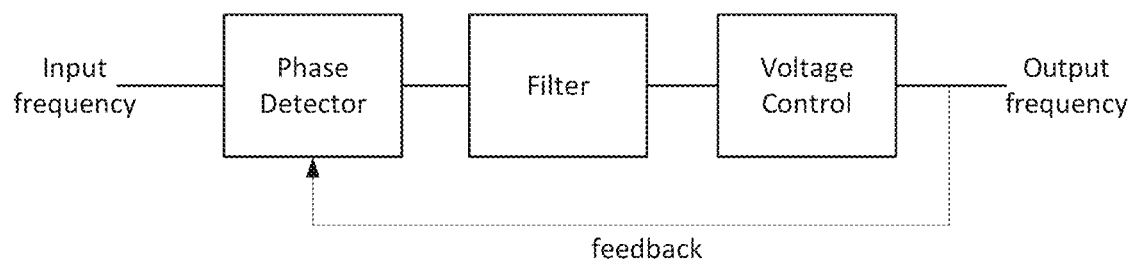
FIG. 26 is a schematic illustration of an implementation of a phase lock loop for use within the virtual air gap control.

The control winding is powered by an electronic circuit switching control circuit, utilising pulse width modulation of an AC control signal, as shown in FIGS. 24 to 26. A high speed microprocessor (such as the 100 MHz Texas Instruments device described at http://www.ti.com/product/TMS320F2808) has sensor inputs from the input and output (the circuit directly before the primary and directly after the secondary windings) to measure voltage and frequency, and Hall effect flux sensors (such as http://uk.rs-online.com/web/c/automation-control-gear/sensors-transducers/hall-effect-sensors/) are embedded within the six control winding holes in the core to measure localised flux.

The microprocessor executes a control process to PWM the four IGBT devices in the bridge circuits shown in FIG. 24. This varies the flow through the control coils in order to maintain the correct level of flux at each monitored location, which in combination with the measured voltage and current input and output, delivers the target setpoint at the output. The flux control feedback loop operates at 1 MHz, and the phase lock loop at 100 kHz.

An energy recovery circuit is included to capture and store the energy diverted as a result of the virtual air gap. This recovery circuit includes a capacitor to allow short term storage and smoothing of the energy flow.

Frequency Conversion Using Heterodyning

As an alternative to the above, in some implementations of an electrical power supply system as described herein the frequency control component 102 achieves frequency conversion using frequency heterodyne principles from communications theory. Although the use of heterodyning as described herein inevitably incurs energy losses, it can be useful in some applications, particularly where the size and weight of the VAGT are constrained, such as aviation, rail and space, for example. In such applications, the kinetic efficiencies gained can outweigh the additional electrical losses.

As known by those skilled in the art, frequency heterodyning is a method that produces new frequencies by combining or mixing two input frequencies. Two signals at frequencies f1 and f2 are mixed combined to create two new signals called heterodynes, one at the sum f1+f2 of the two frequencies and the other at the difference f1+f2. Typically only one of the new frequencies is desired, and the other signal is filtered out.

Accordingly, in such implementations of an electrical power supply system, the frequency control component 102 includes a variable frequency oscillator and a variable frequency filter whose isolation and filter frequencies are determined by the frequency control signals generated by the controller 106, allowing the mixing signal to be varied to ensure that the output signal is always at the desired output frequency. This frequency control also allows the system 100 to be used in the place of a converter (inverter or rectifier).

Returning to FIG. 1, an input signal is shown flowing from left to right in this Figure, with the frequency being adjusted prior to providing a corresponding signal to the VAGT 104. Although this configuration is generally preferred because it allows the VAGT 104 to operate with a signal of known frequency, it is also possible for an input signal to flow in the opposite direction, so that an input signal flows through the VAGT 104 before having its frequency adjusted by the frequency control component 102.

Moreover, the arrangement shown in FIG. 1 can be used to process signals flowing in either direction, which makes it particularly useful for applications such as energy distribution where local energy generation sources (e.g., solar panels on a residential property) can produce energy flowing to the energy distribution network or grid in the opposite direction to energy flowing from the energy distribution network or grid to the residential property.

Figure 4:
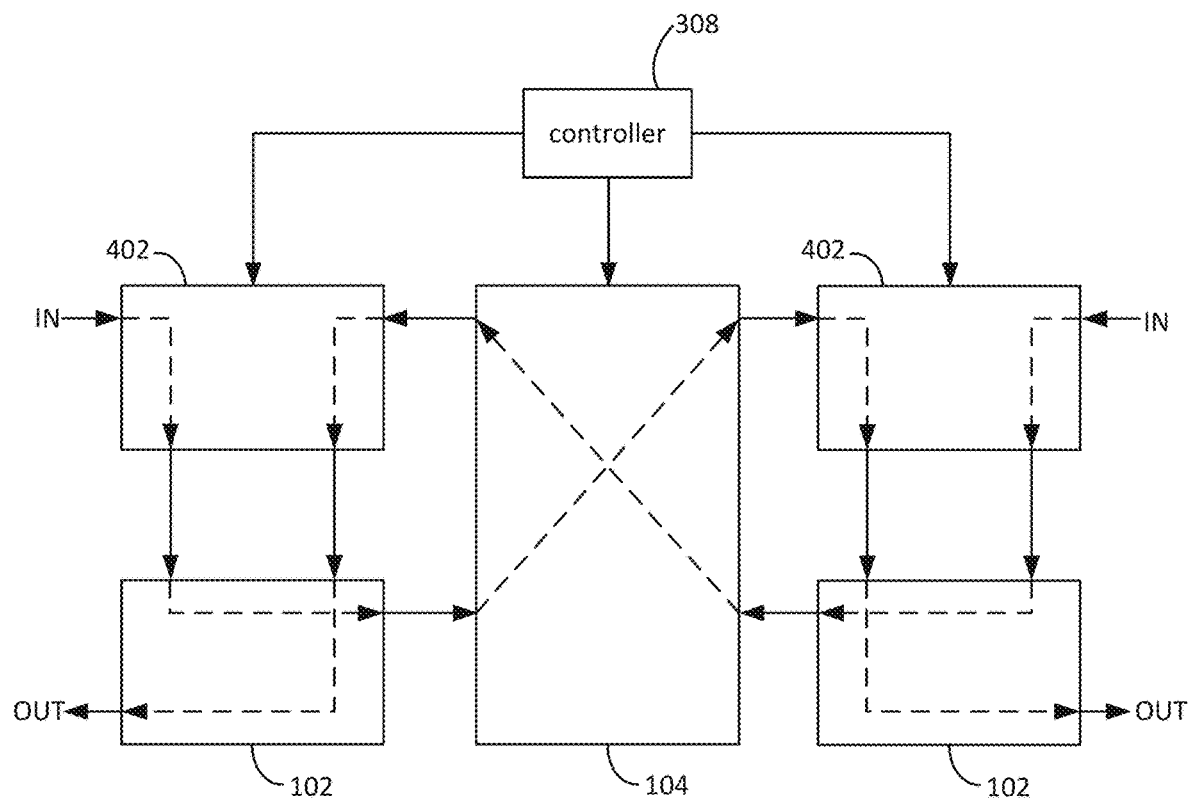
FIG. 4 is a block diagram showing bi-directional flow of electrical energy through an implementation of an electrical energy supply system having two heterodyning components and two filtering components.

For example, FIG. 4 is a block diagram illustrating an electrical energy supply system 400 based on that of FIG. 1, whereby the frequency control component 102 includes a heterodyning component 402 and a frequency filtering component 404, with signals flowing in opposite directions through these components 402, 404 in the appropriate order.

Figure 5:
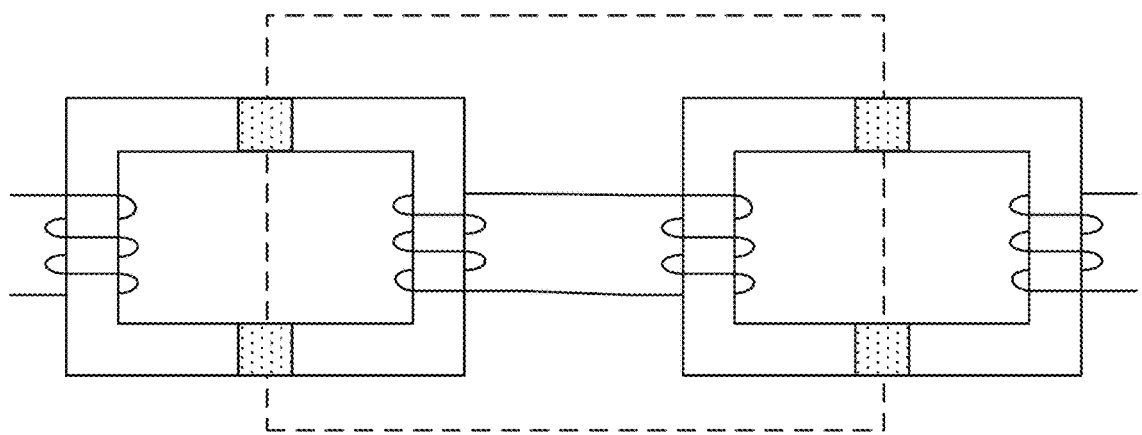
FIG. 5 is a schematic illustration of a composite virtual air-gap transformer (VAGT) formed by two of the single-phase VAGTs of FIG. 1 interconnected in series by way of an internal winding, which can be used to store energy.

FIG. 5 is a block diagram of a further electrical energy supply system 500, having two frequency control components arranged at opposite sides of the VAGT 104, which allows input signals travelling in either direction through the system 500 to have their frequencies adjusted before being provided to the VAGT 104, which can be used to improve the efficiency of the VAGT 104. Moreover, this configuration also allows the frequencies of input signals to be stepped up (e.g., to 1 kHz) before being applied to the VAGT 104, and the corresponding VAGT output to be stepped down (e.g., to the appropriate mains supply frequency of 50 Hz or 60 Hz) to provide the desired output frequency. As the electromotive force (EMF) of a transformer at a given flux density increases with frequency, by operating at higher frequencies the transformers can be physically smaller because the core is able to transfer more power without reaching saturation, and fewer turns are needed to achieve the same impedance.

Having a smaller device reduces the copper loss due to the Ohmic resistance of the transformer windings which is a major inefficiency. The loss for the primary winding is $I_1^2 R_1$ and for secondary winding is $I_2^2 R_2$. Where, $I_1$ and $I_2$ are current in primary and secondary winding respectively, $R_1$ and $R_2$ are the resistances of primary and secondary winding respectively. A smaller device also reduces device weight, a significant advantage in applications such as rail, aviation and space, where overall system efficiency is greatly improved by kinetic energy gains.

However the Iron Losses (Eddy Current and Hysteresis losses) are dependent on and increase with frequency. The hysteresis loss (due to reversal of magnetization in the transformer core) is calculated as:

$$W_h = \eta B \text{ max } 1.6 \text{ fV (watts)}$$

Where $\eta$=Steinmetz hysteresis constant, V=volume of the core in $m^3$, and f is the frequency.

As described above, the electrical energy supply systems described herein are able to bi-directionally control the voltage, frequency and power factor to completely control power flow and deliver an image of a perfect load to the supply side of the system, whilst matching the power requirements of the load. This directly increases the efficiency of the device itself, but also the transmission and distribution of power to other devices and the other devices themselves.

As described below, a modulation and channel-pairing scheme allows power flow through the system to be finely controlled and matched between interconnected power systems and grids to reduce losses and distortion.

Energy Storage

The electrical energy supply systems described herein store instantaneous power in three ways to enable power flow regulation to be optimised by injecting additional power where required. Power is stored within each virtual air gap as magnetic field energy (see below), using additional energy storage methods such as capacitors, and also internal loops can be provided within each system as described below to hold instantaneous power (if required in the specific implementation). However, the VAGT devices are not able to store power over any period whilst not in operation regulating a power flow, except in the case of embodiments where one or more capacitors are included.

The stored energy (W) of an inductor with an inductance (L) and peak current (I) can be determined by the following calculation:

$$W = \tfrac{1}{2} L I^2$$

This energy is stored as magnetic field energy within the ferrite core. The higher the required stored the energy the larger the required core. The size of an inductor is approximately proportional to the stored energy.

When an air gap is added to an inductor, the reluctance of the inductor is increased. The permeability of the core is three orders of magnitude higher than that of the air gap, meaning that the vast majority of the energy is stored within the air gap, and the amount of energy that can be stored is therefore relative to the size of the air gap according to:

$$W = \frac{1}{2} \frac{B^2 \cdot A \cdot \delta}{\mu_0}$$

where
B is the magnetic flux density, A is the cross sectional area, δ is the width of the air gap, and $\mu_o$ is the permeability of the air gap.

Lenz's law states that the direction of an induced current is always such as to oppose the change in the circuit or the magnetic field that produces it. As such, the stored magnetic energy helps to smooth small power oscillations on the secondary winding(s). In some embodiments, an electrical energy supply system includes a composite virtual air-gap transformer (VAGT) consisting of a pair of transformers with virtual air gaps in series, with a wire loop between the secondary winding of one and the primary winding of the other in order to produce a single composite VAGT with an internal current loop. The specifications of the loop are determined by the amount of instantaneous energy storage required. The two transformers with virtual air gaps are controlled as a single device by a single controller. For some applications, this internal loop includes at least one capacitor.

FIGS. 2 and 5 to 13 are schematic diagrams illustrating various different forms of virtual air-transformer (VAGT) that can be used in various embodiments, including composite VAGTs formed by VAGTs interconnected in series by way of an internal loop that can store energy in the form of a magnetic field. For example, the most simple form of VAGT is that shown in FIG. 2, which has a single-phase core with virtual air gaps in the flux path. Energy is stored as magnetic field energy, primarily within the air gaps. Two VAGTs of this type can be interconnected in series in order to form a composite VAGT that is able to store energy by way of an internal winding that interconnects the two VAGTs.

Figure 6:
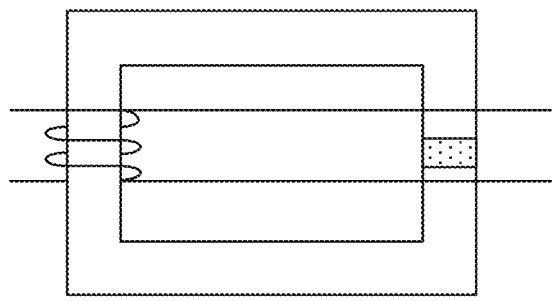
FIG. 6 is a schematic illustration of a second form of virtual air-gap transformer (VAGT) having a single phase core with a virtual air gap in the flux path, and which is able to store energy in the form of a magnetic field energy primarily within the air gap.

FIG. 6 is a schematic illustration of a second form of virtual air-gap transformer (VAGT) having a single phase core with a virtual air gap in the flux path, and which is able to store energy in the form of a magnetic field energy primarily within the air gap.

Figure 7:
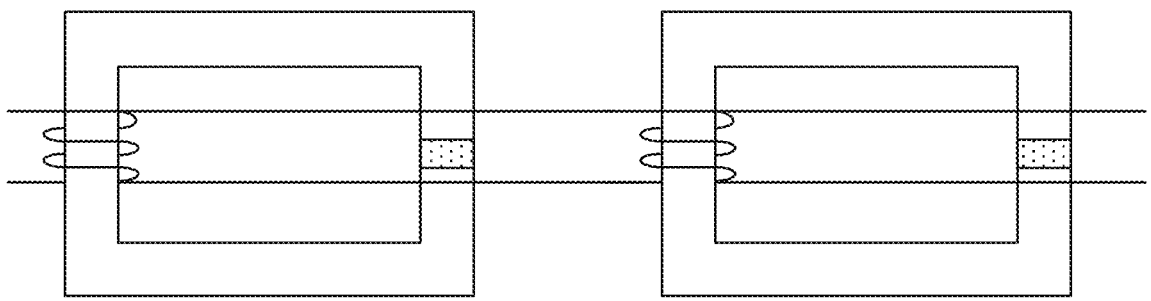
FIG. 7 is a schematic illustration of a composite virtual air-gap transformer (VAGT) formed by two of the single-phase VAGTs of FIG. 6 interconnected in series.

This form of VAGT has both the primary winding and the secondary winding on the same side of the transformer, with one wrapped around the outside of the other, and an electrical shield between the two. As with the VAGT of FIG. 2, two individual VAGTs of the second form can be similarly interconnected in series to form a composite virtual air-gap transformer (VAGT) as shown in FIG. 7.

Figure 8:
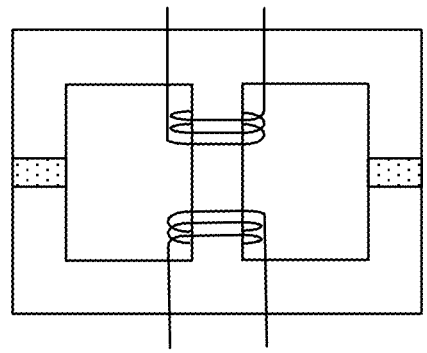
FIG. 8 is a schematic illustration of a third form of virtual air-gap transformer (VAGT) formed by a single phase shell type transformer with virtual air gaps in flux paths.
Figure 9:
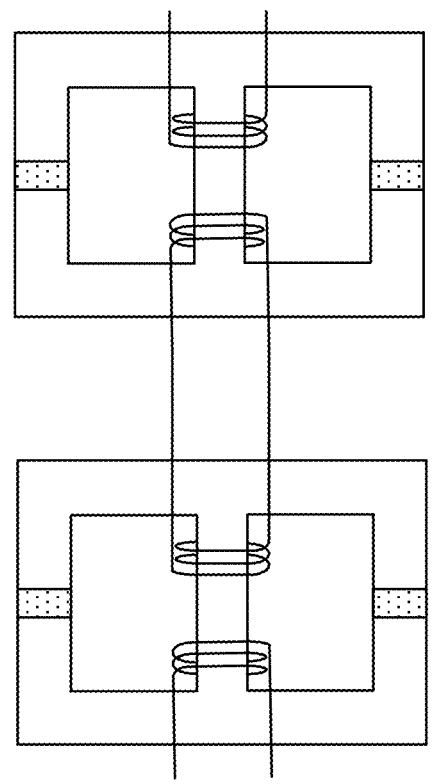
FIG. 9 is a schematic illustration of a composite virtual air-gap transformer (VAGT) formed by two of the single-phase VAGTs of FIG. 8 interconnected in series.

A third form of virtual air-gap transformer (VAGT) is shown in FIG. 8, formed by a single phase shell type transformer with virtual air gaps in its flux paths. Once again, two of these VAGTs can be interconnected in series to form a composite VAGT as shown in FIG. 9.

Figure 10:
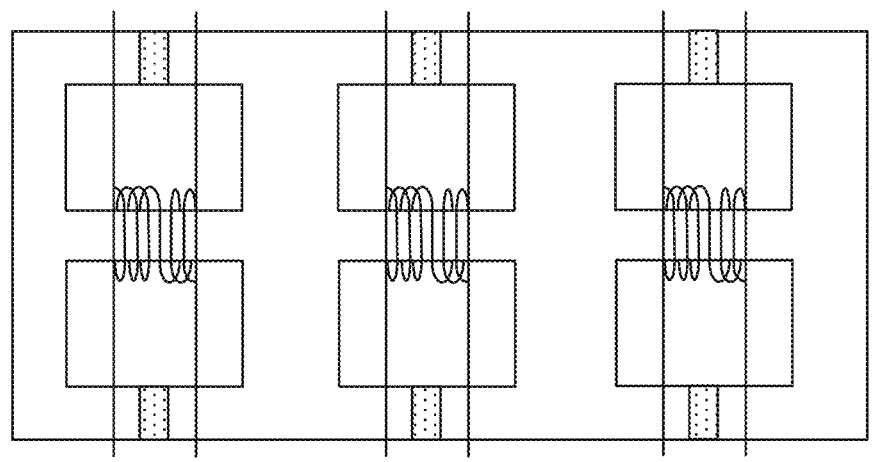
FIG. 10 is a schematic illustration of a fourth form of virtual air-gap transformer (VAGT) formed by a three phase shell type transformer with virtual air gaps in its flux paths.
Figure 11:
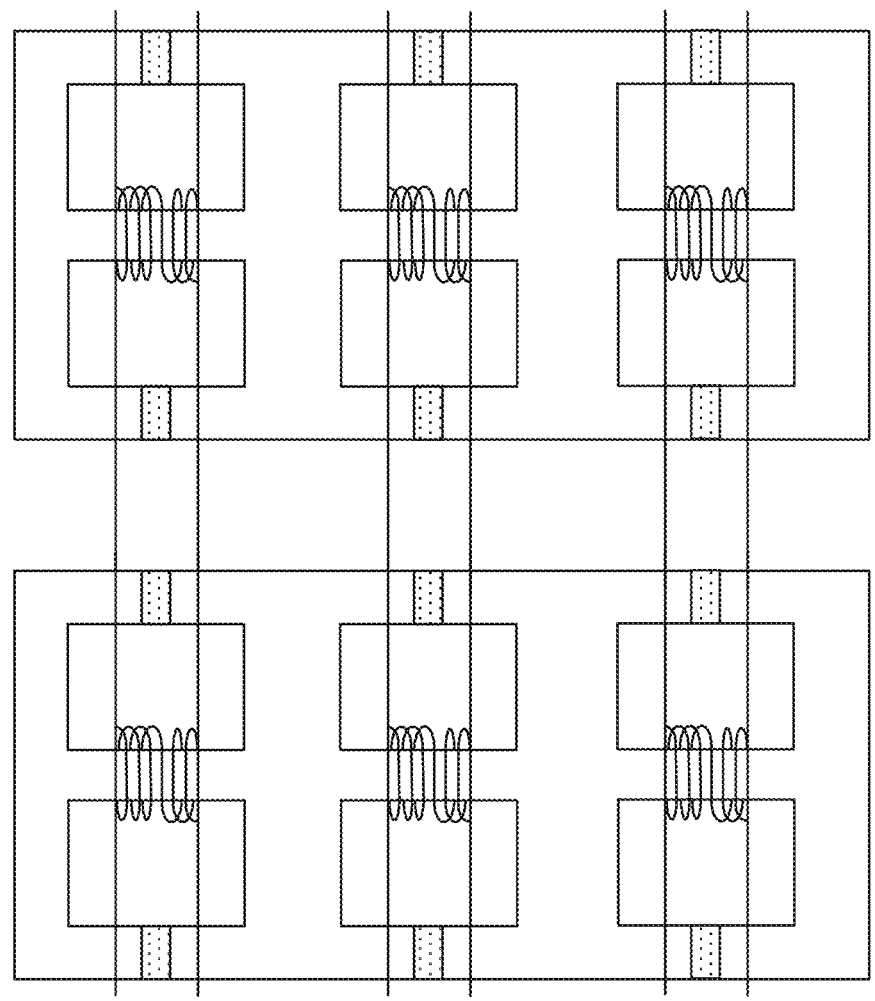
FIG. 11 is a schematic illustration of a composite virtual air-gap transformer (VAGT) formed by two of the three-phase VAGTs of FIG. 10 interconnected in series.

In addition to single-phase VAGTs such as those described above, a VAGT can be formed by a three-phase shell type transformer with virtual air gaps in its flux paths, as shown in FIG. 10 and a pair of these can be interconnected to provide the composite VAGT shown in FIG. 11.

Figure 12:
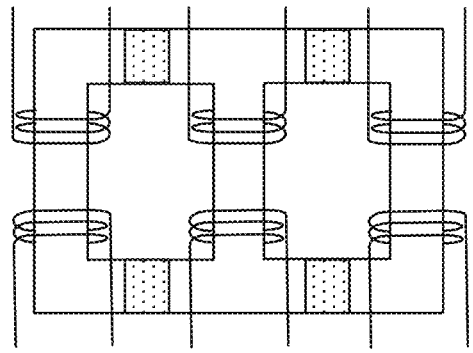
FIG. 12 is a schematic illustration of a fifth form of virtual air-gap transformer (VAGT) formed by a three phase shell type transformer with virtual air gaps in its flux paths.
Figure 13:
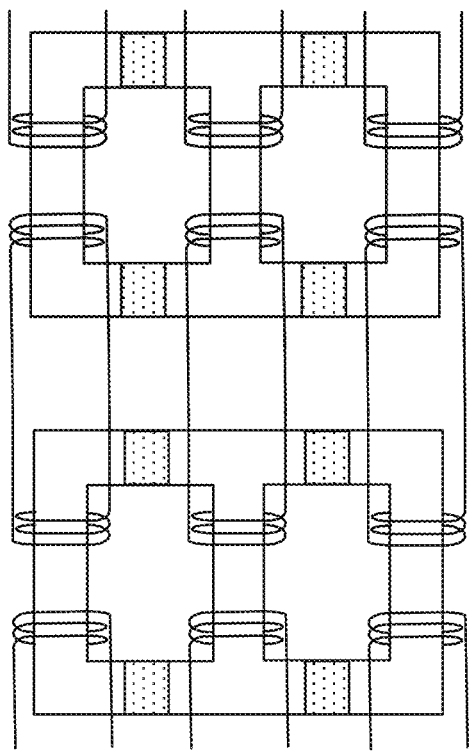
FIG. 13 is a schematic illustration of a composite virtual air-gap transformer (VAGT) formed by two of the three-phase VAGTs of FIG. 12 interconnected in series.

FIG. 12 is a schematic illustration of a fifth form of virtual air-gap transformer (VAGT) formed by a three phase shell type transformer with virtual air gaps in its flux paths, and once again a pair of VAGTs of this general form can be interconnected in series to provide a composite VAGT, such as that shown in FIG. 13.

FIGS. 15 through 22 are schematic diagrams illustrating various different forms of virtual air gap configurations, as demonstrated on a single phase core type transformer core. It will be apparent to those skilled in the art that these and other configurations can be extended to have multiple VAGs, to three phase devices, and to shell type cores.

Figure 15:
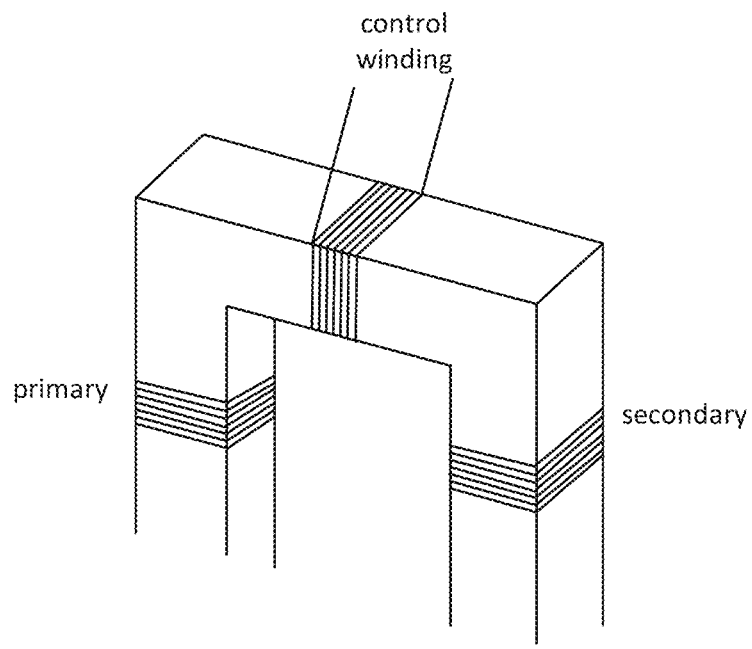
FIG. 15 is a schematic illustration of one implementation of a virtual air gap transformer using a control winding around the core of the device.
Figure 16:
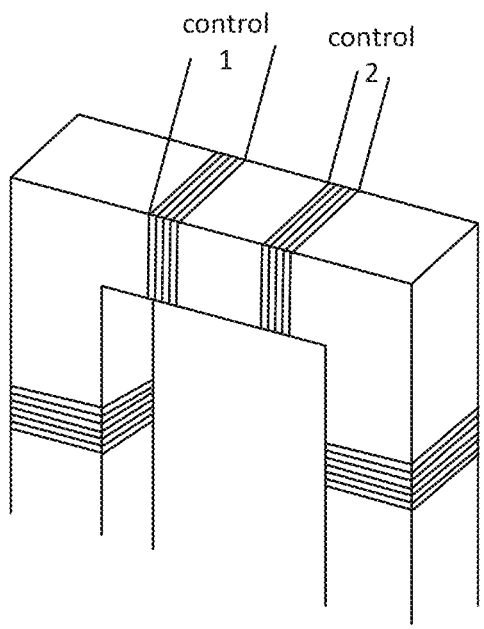
FIG. 16 is a schematic illustration of an alternative implementation of a virtual air gap transformer having multiple control windings around the core of the device to form respective multiple virtual air gaps within the device.
Figure 17:
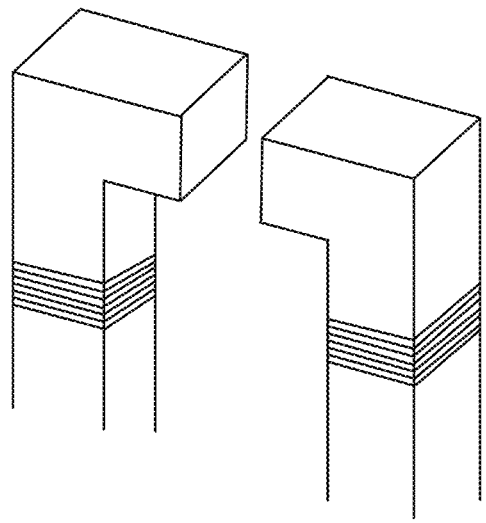
FIG. 17 is a schematic illustration showing two components of a transformer core prior to joining the two components together with a control winding therebetween to form an implementation of a virtual air gap transformer shown in FIG. 18.
Figure 18:
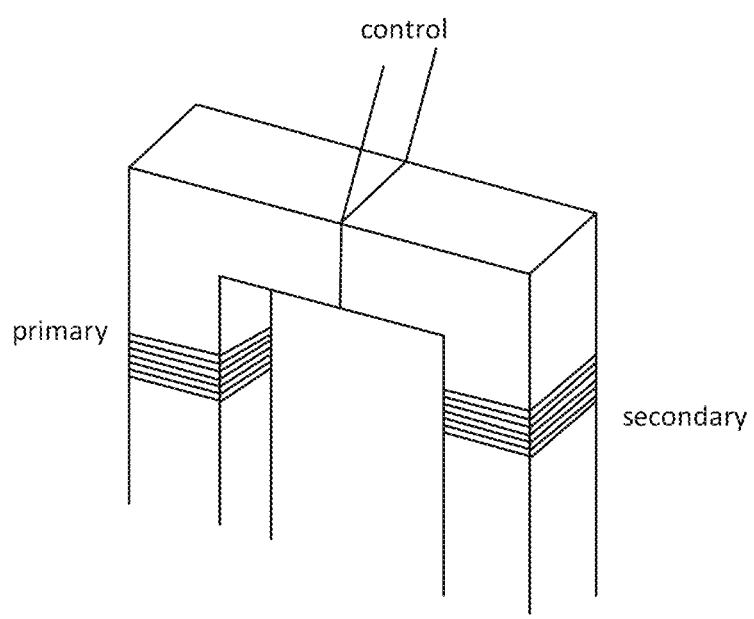
FIG. 18 is a schematic illustration of a virtual air gap transformer formed from the components shown in FIG. 17 and a control winding therebetween.
Figure 19:
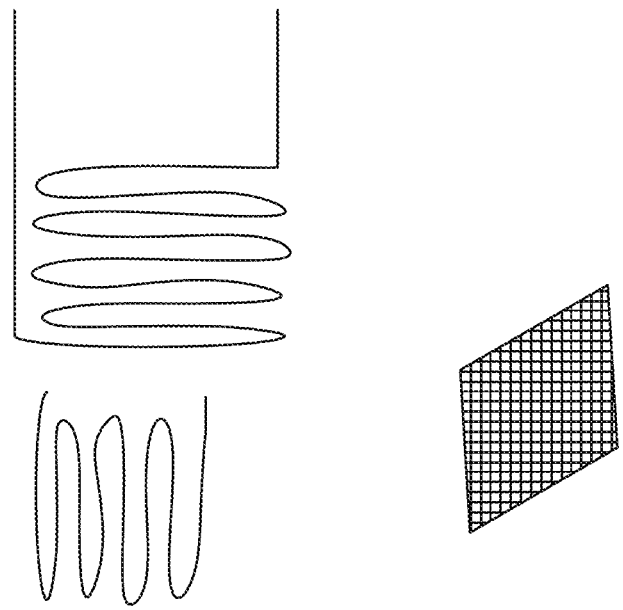
FIG. 19 shows three of the many possible configurations of the control winding used between the pole components of FIGS. 17 and 18.

FIG. 15 is a schematic illustration of an implementation of a virtual air gap transformer (VAGT) using a control winding around the core of the device. FIG. 16 is a schematic illustration of an implementation of a virtual air gap transformer using control windings around the core of the device to generate multiple virtual air gaps within the device, extendible to any practical number of virtual air gaps that can be physically formed or manufactured. FIG. 18 is a schematic illustration of an implementation of the virtual air gap using a control winding between two components of the magnetic core, shown separated in FIG. 17. The winding may consist of wire in any combination of orientations and loops as required, either by itself, or stabilised with a material that the winding is wound around, across, or within. FIG. 19 shows various configurations of the control winding used between the two components of the magnetic core in various different embodiments of the VAGT of FIG. 18. As will be apparent to those skilled in the art, this control winding can be formed by any number of windings in any angle and configuration, either as a solitary item, or wound around a framework or former.

Figure 20:
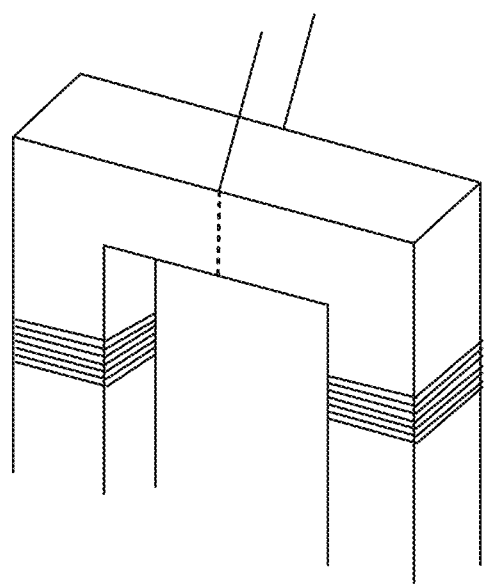
FIG. 20 is a schematic illustration of an implementation of a virtual air gap transformer using a control winding embedded within the magnetic core of the transformer by threading the wire through holes formed through the core.
Figure 21:
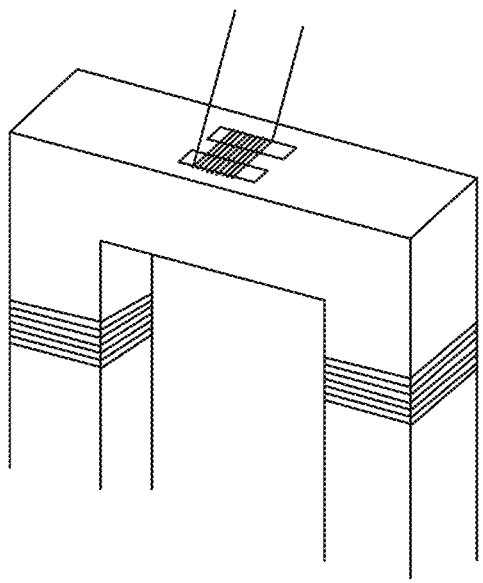
FIG. 21 is a schematic illustration of an implementation of the virtual air gap using a control winding embedded within the core, being wound between columnar openings in any direction (x, y, or z axis)
Figure 22:
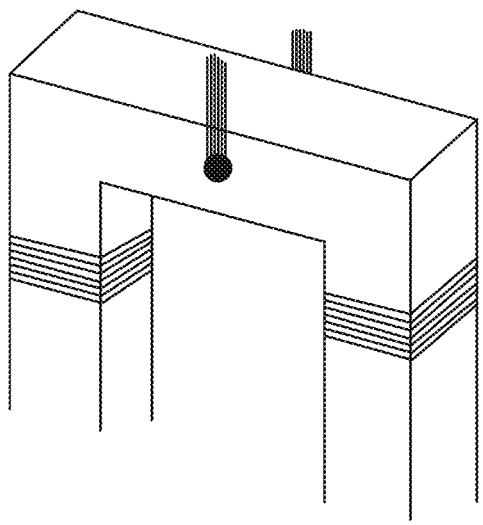
FIG. 22 is a schematic illustration of an implementation of the virtual air gap using a control winding embedded within the core by feeding it through a circular opening formed through the core.
Figure 23:
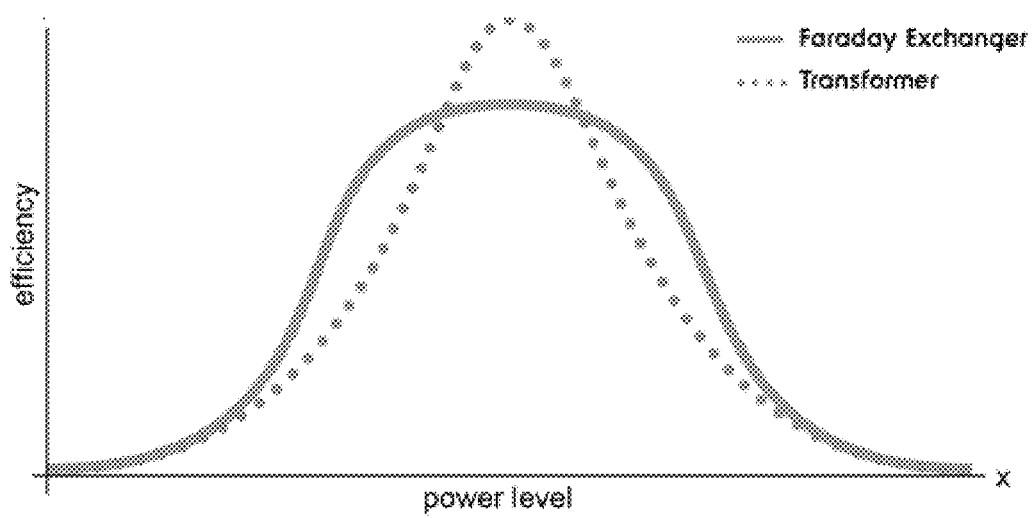
FIG. 23 is a graph of the conversion efficiency of electrical energy supply system described herein compared to that of a traditional transformer (the electrical energy supply system has a lower peak efficiency because it uses power to control the device, however the device has a much wider efficiency band providing better flexibility)

FIG. 20 is a schematic illustration of an implementation of a virtual air gap transformer using a control winding embedded within the magnetic core. This can be in any directional (x, y, or z axis). FIG. 21 is a schematic illustration of an implementation of the virtual air gap using a control winding embedded within the core, being wound in any direction (x, y, or z axis) through columnar openings formed within the core. FIG. 22 is a schematic illustration of an implementation of a virtual air gap transformer using a control winding embedded within the core by feeding it through a circular opening formed through the core.

Controller

As described above, the controller 106 receives a signal representative of the frequency and voltage of a corresponding input signal applied to the system, and, in implementations where heterodyning is used, generates corresponding frequency and voltage control signals that are respectively provided to the frequency control components 102 and the voltage control component 104 in order to control the operation of each of these components to ensure that the corresponding output signal has the desired target output frequency and output voltage.

In the described embodiments, Hall effect flux sensors are utilised located at the specific points where the control winding(s) interact and affect the flux in the magnetic core. These measurements are used in conjunction with the input and output voltage and frequency to determine the control signal required. However, it will be apparent to those skilled in the art that other measurement sensors and techniques can be used to monitor the flux, such as a winding around the magnetic core that will have a current induced based on the flux.

The operational speed of the controller 106 is dependent on the frequency of the power flow being controlled by the system. Given this can be in the kHz range (rather than 50 Hz or 60 Hz for applications in electrical power distribution) after frequency heterodyning, high speed control can be utilised if required by the application requirements in use within a system. Within an electricity grid of 50 Hz or 60 Hz, microprocessors with relative low clock frequencies in the MHz range are sufficient.

The controller 106 constantly measures the voltage and frequency of the input signal and, in some embodiments (most commonly, in embodiments having two VAGTs connected in series), also the voltage and frequency of the output signal to directly control the variable air gap(s) and (where applicable) frequency heterodyning by way of the voltage and frequency control signals in order to maintain a power factor as close to 1 as possible.

In situations where the input in providing more power than the output requires at that instant, the controller reduces the power flow through the VAGT by increasing the reluctance of the VAGT and therefore reducing the flux. Increasing the reluctance of the VAGT means that additional power is stored in the magnetic field of the VAGT.

In situations where the input is providing less power than the output requires at that instant, the controller determines this by monitoring the input and output signals, and generates corresponding control signals to increase the power flow through the VAGT by decreasing the control current in its control winding(s). This decreases the reluctance and increases the flux in the VAGT, discharging stored magnetic energy within the VAGT to the output, thereby delivering an essentially instantaneous power output that is greater than the power input to the VAGT. If the VAGT is already at a minimum level of reluctance (i.e., the DC control current is already zero and thus cannot be decreased further), in some embodiments the energy stored within an internal loop (and capacitor(s) or other energy storage, where available) can be used to compensate for this lack of power in the short term.

An alternative control methodology for the electrical power supply system is a lagging control (rather than a leading control as described above). In this configuration, the system acts in a synchronous manner, with the input and output injecting and sucking energy out of the magnetic field as required and based on the instantaneous input and output power levels. This then changes the reluctance of the magnetic circuit and the balance of efficiency of energy transfer between the primary and secondary windings.

The controller monitors the input and output, and then reacts to the effect of this imbalance to bring the system back to balance.

The ratio of the VAGT windings, the control windings, and the internal loop and capacitor size can all be selected to provide the best balance of efficiency and capacity to compensate for under power situations.

In the described embodiments, the controller 106 is implemented as a field programmable gate array (FPGA), powered from the power flow through the device, and the electrical power supply processes are implemented as configuration data stored in non-volatile memory. However, it will be apparent to those skilled in the art that in other embodiments the controller 106 could be implemented as an application-specific integrated circuit (ASIC), or as a microprocessor programmed to execute instructions stored in non-volatile memory. It will also be apparent to those skilled in the art that in other embodiments the controller may be powered by a separate local power supply where available, such as local control power from a distribution board.

Extending upon the PWM control implementation described above, the measured flux is used for a control feedback loop with the FPGA (or other controller device, where applicable) as shown in FIG. 25. The reference signal for this control is provided by a phase lock loop (PLL) driven by the measured flux. The phase lock loop uses a phase detector, filter and voltage control oscillator with a feedback loop to lock the input and output frequency with each other as shown in FIG. 26. In the described embodiments, the phase lock loop is controlled at a speed of 1 kHz; however, it will be apparent to those skilled in the art that a different control speed can be used in other embodiments.

Figure 14:
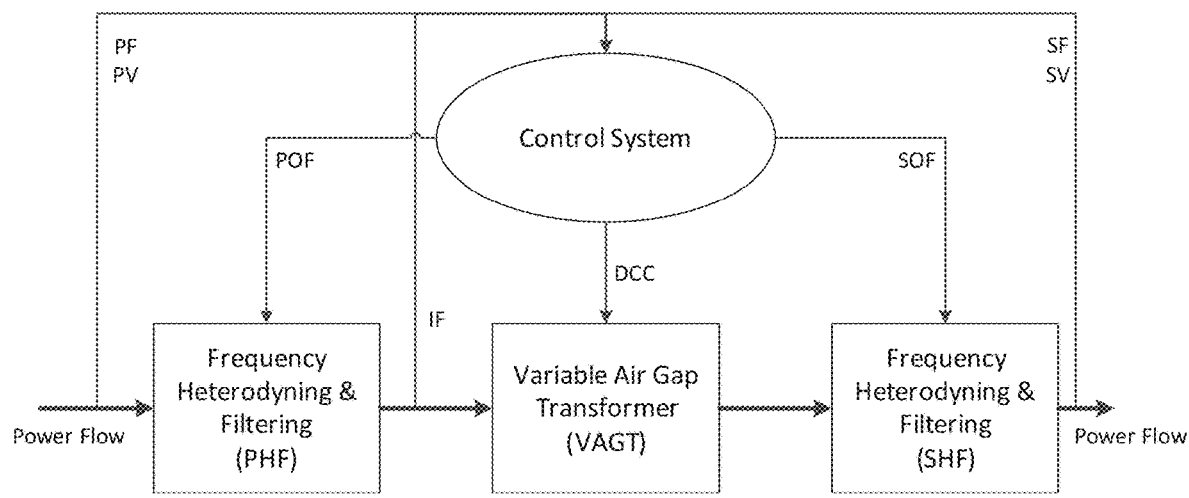
FIG. 14 is a simplified block diagram illustrating the flow of signals between components of an energy supply system implemented to support heterodyning.

With reference to the schematic diagram of FIG. 14, Table 2 below shows the inputs, outputs and internal variables used by the controller 106 to control the operation of an electrical energy supply system having two frequency control components 102 functionally disposed on either side of a voltage control component or VAGT 104, as described above.

| Name | Description | Type |
|------|-------------|------|
| PF | Primary Frequency | Analogue Input |
| PV | Primary Voltage | Analogue Input |
| SF | Secondary Frequency | Analogue Input |
| SV | Secondary Voltage | Analogue Input |
| IF | Internal Frequency | Analogue Input |
| POF | Primary Oscillator Frequency | Analogue Output |
| SOF | Secondary Oscillator Frequency | Analogue Output |
| DCC | DC Control Current | Analogue Output |
| PFS | Primary Frequency Setpoint | Control Variable |
| SFS | Secondary Frequency Setpoint | Control Variable |
| PVS | Primary Voltage Setpoint | Control Variable |
| SVS | Secondary Voltage Setpoint | Control Variable |

Control Diagram

Each of the PDF, VAGT and SHF receives a control input from the controller 106 in the form of an analogue signal. The controller 106 system receives analogue inputs from the power flow through the device using standard phase and voltage measurement devices on the input and output signals in order to determine what its control outputs are. Suitable devices include those described at http://www.ni.com/white-paper/8198/en/#toc3, https://www.pce-instruments.com/english/measuring-instruments/test-meters/3-phase-power-meter-kat_155415_1.htm, http://w3.siemens.com/powerdistribution/global/en/lv/portfolio/pages/7km-pac-measuring-devices.aspx, and http://www.schneider-electric.com/en/product-category/4100-power---energy-monitoring-system.

To illustrate the general operation of the electrical power supply systems described herein, the following describes the steps of an electrical power supply process for an example case wherein an electrical power supply systems receives single phase power in the form of an input signal with power flow from primary to secondary, i.e. to a source on the primary side and a load on the secondary side.
1. Input to device is PF and PV
2. Measure PF and PV as input into PHF
3. Calculate the required POF to create the required frequency input for the VAGT
4. Inject POF into PHF and filter out undesired heterodyne
5. PHF outputs power with voltage PV and frequency IF at much higher level than PF
6. Measure IF as input into VAGT along with PV
7. Calculate the required DCC based on PV and SV to inject into VAGT to deliver SVS
8. Inject DCC into VAGT to control the mmf (magnetomotive force) by varying the reluctance of the VAGT, thereby affecting the output voltage with a fixed winding ratio
9. VAGT outputs power with voltage SVS and frequency IF
10. Calculate the required SOF to create the SFS
11. Inject SOF into SHF and filter out undesired heterodyne
12. SHF outputs power with voltage SVS and frequency SFS
13. Output of device is SVS and SFS to align with SV and SF The same process applies for reverse power flow by interchanging the primary and secondary inputs, outputs and setpoints. The same process can be used for 3 phase power by applying to each phase.

It will be apparent that the electrical power supply system and process described herein are particularly advantageous as they are able to dynamically and rapidly respond to changes in the input energy received by the system in order to generate corresponding output energy having a target voltage and a target frequency. In particular, this ability allows the described system and process to match the output energy to the energy required by the loads on the system. Moreover, the system and process are bi-directional, meaning that they are able to do this for energy supplied from an energy grid and flowing in one direction, for example, and also for energy supplied from renewable energy sources, which may be flowing through the system in the opposite direction. For example, changes in local energy generation arising from changes in wind and/or changes in available sunlight are able to be mitigated by the system and process to provide a relatively constant output for a fixed load. Similarly, changes in the load on the system can be compensated for within the ability of the corresponding virtual air-gap transformer(s), which of course are constrained to operate within the voltage range determined by the limits of zero and complete local saturation within the magnetic core of each individual VAGT, which are determined by the configuration of each VAGT. It will be apparent that a range of VAGTs with different virtual air-gap configurations can be manufactured to meet respective requirements of voltage and power variability for given applications.

Many modifications will be apparent to those skilled in the art without departing from the scope of the present invention.

The invention claimed is:

1. An electrical power supply system, including:
at least one virtual air gap transformer, including at least one primary winding, at least one secondary winding, and one or more control windings to control the electromagnetic coupling between the primary and secondary windings, wherein the virtual air gap transformer is configured to saturate a region of an electromagnetic core of the at least one virtual air gap transformer to control electromagnetic coupling between the primary and secondary windings, a size of the saturated region determined by electrical current flowing through the one or more control windings;
a heterodyning component configured to receive a signal including a first fundamental frequency and to generate a corresponding heterodyned signal having frequency components corresponding to a sum and a difference of the first fundamental frequency and a reference frequency;
a filtering component configured to filter a heterodyned signal to remove one of the sum and the difference frequency components therefrom and provide a corresponding filtered signal;
an input port configured to receive a first input signal including a first input fundamental frequency and a first input voltage; and
a control component configured:
(i) to receive a signal representing at least the first input fundamental frequency of the first input signal and to generate a corresponding frequency control signal to determine a reference frequency of the heterodyning component such that the filtered signal has a target output frequency; and
(ii) to receive a signal representing the first input voltage, and to generate a corresponding virtual air gap control signal to determine the electrical current in the control windings of the at least one virtual air gap transformer, such that a target output voltage is generated at the secondary windings;
wherein the electrical power supply system is configured to receive input electrical energy in the form of the first input signal including the first input fundamental frequency and the first input voltage, and to generate corresponding output electrical energy in the form of a corresponding first output signal of the target frequency and the target output voltage.

2. The electrical power supply system of claim 1, wherein the system is configured for bi-directional use such that the system receives second input electrical energy in the form of a second input signal including a second input fundamental frequency and a second input voltage, and to generate corresponding output electrical energy in the form of a corresponding second output signal of a second target frequency and a second target output voltage, wherein the second input signal or a corresponding signal derived from the second input signal is applied to the secondary winding of the at least one virtual air gap transformer to generate a corresponding signal including the second target output voltage at the primary winding of the virtual air gap transformer.

3. The electrical power supply system of claim 2, wherein the second input signal or a corresponding signal derived from the second input signal is received by the heterodyning component to generate a corresponding second heterodyned signal including second frequency components corresponding to a sum and a difference of the second fundamental frequency and a reference frequency, and the filtering component is configured to filter the second heterodyned signal to remove one of the sum and the difference frequency components therefrom and provide a corresponding second filtered signal.

4. The electrical power supply system of claim 2, wherein the heterodyning component is a first heterodyning component, the filtering component is a first filtering component, and the system includes a second heterodyning component and a second filtering component, wherein the first heterodyning component and the first filtering component are configured to process signals flowing through the system along a first pathway, and the second heterodyning component and the second filtering component are configured to process signals flowing through the system along a second pathway generally opposite in sense to the first pathway.

5. The electrical power supply system of claim 1, wherein the heterodyning component is a first heterodyning component, the filtering component is a first filtering component, and the system includes a second heterodyning component and a second filtering component, wherein the heterodyning components and the filtering components are configured such that the first signal received by the system is upconverted to a higher frequency by the first heterodyning component and the first filtering component before being provided as an input to the at least one virtual air gap transformer, and the corresponding output of the at least one virtual air gap transformer is downconverted to the target frequency by the second heterodyning component and the second filtering component, the use of the higher frequency improving the efficiency of the at least one virtual air gap transformer.

6. The electrical power supply system of claim 1, wherein the at least one virtual air gap transformer includes two or more virtual air gap transformers connected in series by one or more corresponding loops configured to store energy.

7. The electrical power supply system of claim 1, including one or more inductors and/or one or more capacitors configured to store and release energy.

8. The electrical power supply system of claim 1, wherein the at least one virtual air gap transformer includes at least one single-phase virtual air gap transformer.

9. The electrical power supply system of claim 1, wherein the at least one virtual air gap transformer includes at least one three-phase virtual air gap transformer.

10. The electrical power supply system of claim 1, wherein the at least one virtual air gap transformer includes at least one shell-type virtual air gap transformer.

11. The electrical power supply system of claim 1, wherein the at least one virtual air gap transformer includes at least one virtual air gap transformer including a magnetic core composed of different materials including respective different magnetic properties such that a region of the magnetic core in which a virtual air gap is formed in the magnetic circuit is composed of a first material and another region of the magnetic core is composed of a second material, wherein at least one magnetic property of the first material has a different value to a value of that at least one magnetic property of the second material.

12. The electrical power supply system of claim 1, wherein the at least one virtual air gap transformer includes a virtual air gap transformer including one or more control windings disposed between opposing faces of respective pole pieces of the virtual air gap transformer.

13. The electrical power supply system of claim 12, wherein each control winding is in the form of a serpentine planar loop.

14. The electrical power supply system of claim 12, wherein each control winding is in the form of a spiralling circular planar loop.

15. The electrical power supply system of claim 12, wherein the control windings include one or more serpentine planar loops and one or more spiralling circular planar loops.

16. The electrical power supply system of claim 12, wherein the one or more control windings are wound around a core section.

17. The electrical power supply system of claim 1, wherein the at least one virtual air gap transformer includes a virtual air gap transformer including a magnetic core with mutually spaced openings formed therein, one or more control windings being wound through the openings and around portions of the magnetic core disposed between the openings.

18. The electrical power supply system of claim 17, wherein the magnetic core is formed by stacked laminations, and the openings are defined by gaps in the stacked laminations.

19. The electrical power supply system of claim 17, wherein the magnetic core is in the form of a solid body, with openings formed by drilling after manufacture.

20. The electrical power supply system of claim 1, wherein the at least one virtual air gap transformer includes multiple virtual air gaps arranged to selectably define opposing flux paths through the at least one secondary winding.

21. The electrical power supply system of claim 1, wherein the at least one virtual air gap transformer includes multiple virtual air gaps arranged to define multiple flux paths to allow control of the amount of flux flowing through the at least one secondary winding.

22. An electrical power supply process, including:
receiving, at a control component of an electrical power supply system, at least one signal representing at least a time-varying first fundamental frequency of a first input signal and a time-varying first voltage of the first input signal;
processing the received signal to generate:
(i) a corresponding frequency control signal to cause a heterodyning component of the electrical power supply system to generate a corresponding heterodyned signal including frequency components corresponding to a sum and a difference of the first fundamental frequency and a reference frequency; and
(ii) a corresponding voltage control signal to cause a virtual air-gap transformer of the electrical power supply system to generate a corresponding signal including a target output voltage, wherein the voltage control signal is applied to at least one control winding of the virtual air-gap transformer to cause generation of the target output voltage, and wherein the virtual air-gap transformer is configured to saturate a region of an electromagnetic core of the virtual air-gap transformer to control electromagnetic coupling between windings of the virtual air-gap transformer, a size of the saturated region determined by electrical current flowing through the at least one control winding;
whereby the received input electrical energy in the form of the first input signal including the first input fundamental frequency and the first voltage is processed to generate corresponding output electrical energy in the form of a corresponding first output signal of the target frequency and the target output voltage.

23. The electrical power supply process of claim 22, wherein the heterodyning component is a first heterodyning component, the filtering component is a first filtering component, and the system includes a second heterodyning component and a second filtering component, wherein the process includes controlling the heterodyning components and the filtering components such that the first signal received by the system is upconverted to a higher frequency by the first heterodyning component and the first filtering component before being provided as an input to the at least one virtual air gap transformer, and the corresponding output of the at least one virtual air gap transformer is downconverted to the target frequency by the second heterodyning component and the second filtering component, the use of the higher frequency improving the efficiency of the at least one virtual air gap transformer.

* * * * *